(12) United States Patent
Vantalon et al.

(10) Patent No.: US 7,711,954 B2
(45) Date of Patent: May 4, 2010

(54) METHODS AND APPARATUSES FOR CONFIGURING PRODUCTS

(75) Inventors: Luc Vantalon, Sunnyvale, CA (US); Paolo Siccardo, Los Altos, CA (US)

(73) Assignee: Digital Keystone, Inc., Mountain View, CA (US)

( * ) Notice: Subject to any disclaimer, the term of this patent is extended or adjusted under 35 U.S.C. 154(b) by 1232 days.

(21) Appl. No.: 10/913,671

(22) Filed: Aug. 5, 2004

(65) Prior Publication Data

US 2006/0031676 A1    Feb. 9, 2006

(51) Int. Cl.
    *G06F 9/00*    (2006.01)
(52) U.S. Cl. .................... 713/168; 713/173; 713/169
(58) Field of Classification Search ............ 713/1, 713/168, 169
    See application file for complete search history.

(56) References Cited

U.S. PATENT DOCUMENTS

| 4,860,353 | A |   | 8/1989  | Brown |
| 5,703,950 | A |   | 12/1997 | Jovanovich et al. |
| 5,970,143 | A |   | 10/1999 | Schneier et al. |
| 6,064,989 | A | * | 5/2000  | Cordery et al. ............... 705/50 |
| 6,272,636 | B1 |   | 8/2001 | Neville et al. |
| 7,131,004 | B1 | * | 10/2006 | Lyle ........................... 713/169 |
| 2002/0032903 | A1 | * | 3/2002 | Sprunk ......................... 725/1 |
| 2004/0052380 | A1 | * | 3/2004 | Sprunk ....................... 380/286 |

FOREIGN PATENT DOCUMENTS

EP          0 881 600 A2    12/1998
EP          1 081 891 A2     3/2001
WO     WO 2004/019615 A1     3/2004

OTHER PUBLICATIONS

Chapter I International Preliminary Report on Patentability for PCT/US2005/027892, mailed Feb. 15, 2007.
Society of Cable Telecommunications Engineers (SCTE). ANSI/SCTE 41, 2003.
International Search Report and Written Opinion of the International Searching Authority for PCT/US2005/027892, mailed Oct. 31, 2005.
European Search Report for EP Application No. 06126945.2, dated Oct. 22, 2008 (7 pages).
Van Moffaert, A. et al. "Digital Rights Management," Technology White Paper, Alcatel Telecommunications Review, Alcatel, Paris, Apr. 1, 2003, pp. 1-7.

* cited by examiner

*Primary Examiner*—Kimyen Vu
*Assistant Examiner*—Randal D Moran
(74) *Attorney, Agent, or Firm*—Blakely, Sokoloff, Taylor & Zafman LLP

(57) ABSTRACT

Methods and apparatuses for securely configuring the identifier information of products. In one aspect, a method of manufacturing a product, includes: establishing a connection between a data processing system and the product while the product is being manufactured; verifying that an initial set of identifier information stored within the product is valid, where a set of identifier information is capable of being used to control distribution of media which is received by the product; providing, in response to validly verifying the initial set of identifier information, a new set of identifier information for storage in the product, where the providing is secured through the verifying of the initial set of identifier information.

98 Claims, 18 Drawing Sheets

METHODS AND APPARATUSES FOR CONFIGURING PRODUCTS

FIELD OF THE TECHNOLOGY

The invention relates to product serialization, more particularly, to configuring products for authentication, such as configuring digital television sets to have unique identities suitable for use in a copy protection system.

BACKGROUND

Communication signals typically propagate from the source to the destination through one or more segments of transmission media. Some segments of the transmission media may not be physically secured against unauthorized access. To protect the content embedded in the transmitted signals against unauthorized access, many communication protocols, authentication and encryption/scrambling methods have been developed and used. Research and development in this field will further lead to better protocols and methods. It is understood that any of these protocols and methods can be used with the present invention.

A device is typically assigned a set of identifier information to facilitate authentication. The set of identifier information represents the device. The set of identifier information typically includes secret information, which can be used to prove the authenticity of its identity. When the secret information is revealed, other devices may be used to pretend to be this device. The authentication process ensures that the other party in the communication process is indeed the intended recipient.

Further, the set of identifier information may also include secret information for establishing a secured (encrypted/scrambled) communication channel for the protection of the transmitted content. The secret information for establishing a secured communication channel may be unique for each of the devices in the system, or be shared information. When such information is revealed, the security strength of the communication channel may degrade.

For example, a digital certificate based on public key cryptography can be used as a part of the identifier information. In public key cryptography, a pair of two complementary keys, a public key and a private key, are such that any information digitally signed using the private key can only be verified using the public key, and conversely, any information encrypted using the public key can only be decrypted using the private key. Typically, a trusted party called a certificate authority issues a digital certificate. The certificate confirms the authenticity of an identity with a digital signature of the certificate authority. The digital signature of the certificate is generated using the private key of the certificate authority. The certificate authority's public key can be used to verify the authenticity of the certificate. The information encrypted using the public key of the identity can only be decrypted using the private key of the identity. The private key associated with the identity is the secret information, which when compromised allows others in possession of the private key to decrypt the information intended for the identity. On the other hand, the private key of the identity can be used to sign information sent from the identity. The public key associated with the identity can be used to verify that the digitally signed information is from one in possession of the private key of the identity.

Diffie-Hellman is a public key agreement protocol based on the intractability of taking discrete logarithms over the integer field. The protocol uses two system parameters p and g, which are used by all the users of a system. Parameter p is a prime number; and parameter g is an integer less than p and is capable of generating a number from 1 to p−1 using a number n and the expression ($g^n$ mod p). To derive a shared secret key, two users first pick their own random private values a and b respectively. Then, the two users compute public values ($g^a$ mod p) and ($g^b$ mod p) respectively. After exchanging the public values, the two users compute a shared secret key ($g^{ab}$ mod p) using the exchanged public values. The two users can then use the shared secret key to encrypt and decrypt messages.

Dynamic Feedback Arrangement Scrambling Technique (DFAST) is a technique for scrambling binary data. American National Standards Institute/Society of Cable Telecommunications Engineers (ANSI/SCTE) 41 2003 requires the use of DFAST. Detailed aspects of DFAST may be found in U.S. Pat. No. 4,860,353.

Many communication protocols and data encryption/scrambling schemes have been developed based on known technologies, such as digital certificates and digital signatures, Diffie-Hellman and DFAST, to provide a desirable strength of security for communication over an insecure medium. For example, ANSI/SCTE 41 2003 standard makes use of the signature verification techniques, Diffie-Hellman and DFAST to provide a Point of Deployment (POD) copy protection system. According to the ANSI/SCTE 41 2003 standard, a Point of Deployment (POD) security module provides protections for valuable contents distributed through a digital cable system (e.g., the high value movies and video programs). When authorized, a POD module removes the scrambling that is added by the conditional access scrambling system. Before delivery of the content to a host (e.g., set-top terminals, or consumer receivers, such as a digital television set, or a personal video recorder (PVR)), the POD module may re-scramble the content, such as the movies and video programs. A POD copy protection system performs: 1) host authentication through the exchange of certificates and through the use of signature verification techniques; and 2) copy protection key derivation using a Diffie-Hellman shared secret key that is computed during the host verification process. The POD module uses the copy protection key to re-scramble the content before delivery with copy control information over a secure channel of communication to the receiver. Further details about the methods and schemes to protect contents over the insecure medium between the POD and the host can be found in ANSI/SCTE 41 2003, which is hereby incorporated here by reference.

A "Man in the Middle" attack may break the security provided by public key cryptography. In a "Man in the Middle" attack, an attacker intercepts the transmission of the public key of a victim and substitutes it with the public key of the attacker. Thus, a message intended for the victim becomes encrypted with the public key of the attacker. As the "Man in the Middle", the attacker decrypts the message using its own private key, re-encrypts it with the public key of the victim and relays the message to the victim. Thus, the attacker gains access to the message that is intended only for the victim. Communication protocols have been designed to resist "Man in the Middle" attacks. For example, ANSI/SCTE 41 2003 requires the verification of an authentication key to resist "Man in the Middle" attacks.

In general, a product may use a combination of a number of encryption/scrambling techniques and authentication techniques with a particular communication protocol to achieve a desired strength of protection against unauthorized access.

SUMMARY OF THE DESCRIPTION

Methods and apparatuses for securely configuring the identifier information of products are described here. Some of the embodiments of the present invention are summarized in this section.

In one aspect of the present invention, a method of manufacturing a product, includes: establishing a connection between a data processing system and the product while the product is being manufactured; verifying that an initial set of identifier information stored within the product is valid, where a set of identifier information is capable of being used to control distribution of media which is received by the product; providing, in response to validly verifying the initial set of identifier information, a new set of identifier information for storage in the product, where the providing is secured through the verifying of the initial set of identifier information. In one example of an embodiment, the method further includes: verifying the device has the new set of identifier information; updating a database to establish that the product has the new set of identifier information; verifying that the new set of identifier information is unique relative to other products which are otherwise the same as the product; and verifying that the new set of identifier information can be used to decrypt or descramble media received by the product when in use; where the media is at least one of audio media or visual media or audiovisual media. In one example of an embodiment, the connection is secured through the verifying that the initial set of identifier information is valid; and the data processing system negotiates a session key with the product after the verifying. In one example, each of the initial and new sets of identifier information comprises a digital certificate; and the verifying uses a digital signature verification technique. The same physical interface (e.g., a communication port of the product) implemented for controlling distribution of media (e.g., through a copy protection system) can be used to communicate the new set of identifier information from the data processing system to the product. Alternatively, the security scheme of the physical interface implemented for controlling distribution of media (e.g., through a copy protection system) can be used on a different physical interface of the product to securely communicate the new set of identifier information from the data processing system to the product. In one example, the product is capable of using the new set of identifier information on a first physical interface to control distribution of media through the first physical interface (e.g., using a copy protection protocol on the first physical interface to control distribution of media); and the new set of identifier information is provided to the product through the first physical interface. In another example, the product is capable of using the new set of identifier information with a content protection protocol on a first physical interface to protect content distributed through the first physical interface; and the new set of identifier information is provided to the product through a second physical interface secured using the initial set of identifier information and the content protection protocol.

In one aspect of the present invention, a method to configure a device, includes: establishing a connection with the device through successfully verifying an initial set of identifier information stored within the device; and through the secure connection, communicating a new set of identifier information to the device as a replacement of the initial set of identifier information in the device. In one example of an embodiment, the method further includes: loading the initial set of identifier information into the device before the connection is established with the device; making a new connection with the device through verifying the new set of identifier information stored within the device to determine whether or not the device successfully assumes the new set of identifier information; transmitting data through the new connection to test the device; and recording information indicating the device has the new set of identifier information. In one example, the communicating of the new set of identifier information is performed while the device is in a manufacturing process. In one example, each of the initial and new sets of identifier information includes a digital certificate which is verifiable using a digital signature verification technique; the connection is secured using a dynamically generated session key for encryption or scrambling and authenticated using at least a portion of the initial set of identifier information. In one example, the device is designed to be selectively enabled by a connection made through providing the new set of identifier information for verification. For example, the device receives media information through a copy protection system; the new set of identifier information is for the operations of the copy protection system; and the connection is established with the device using a communication protocol of the copy protection system, such as one that is in accordance with American National Standards Institute/Society of Cable Telecommunications Engineers (ANSI/SCTE) 41. The device may be one of: a digital television set; a set-top box; a personal video recorder; and a portable media player. In one example of an embodiment, the new set of identifier information serializes the device to have a unique identity for authentication. In one example, a server stamps the new set of identifier information using at least a portion of the initial set of identifier information for authenticity (e.g., digitally signing the new set of identifier information according to the initial set of identifier information for communication to the device). For example, the new set of identifier information is encrypted using a public key of the initial set of identifier information (or a session key of a secure authenticated channel established using the initial set of identifier information) and digitally signed using a private key of the initial set of identifier information.

In one aspect of the present invention, a method to configure a device, includes: establishing a connection with a server through providing an initial set of identifier information stored within the device for a successful verification; through the connection, receiving a new set of identifier information at the device as a replacement of the initial set of identifier information; and replacing the initial set of identifier information with the new set of identifier information in the device. In one example of an embodiment, the receiving of the new set of identifier information is performed while the device is in a manufacturing process; each of the initial and new sets of identifier information includes a digital certificate verifiable using a digital signature verification technique; the connection is secured through a key for one of: encryption and scrambling; and the key is derived using at least a portion of the initial set of identifier information. In one example of an embodiment, the device is designed to be selectively enabled by a connection made through providing the new public set of identifier information for verification. For example, the device may be a cable-ready TV or PVR, a portable media player, a multimedia cellular phone, a multimedia computer, a car radio (digital FM or Satellite), a car navigation system, a car security system, a digital cinema projector, or others. In one example of an embodiment, the device receives media information through a copy protection system; the new set of identifier information is for the operations of the copy protection system. In one example of an embodiment, the connection is established with the device using a communication protocol of the copy protection system; and the connection is secured through the copy protection system. In one example, the device verifies authenticity of the new set of identifier information using the initial set of identifier information (e.g., verifying that the new set of identifier information received at the device is digitally signed according to the initial set of identifier information).

In one aspect of the present invention, a device according to one embodiment of the present invention includes: a memory to store an initial set of identifier information; a first communication port; and a logic circuit coupled with the first communication port and the memory. The logic circuit is to use the first communication port to establish a connection with a server through providing the initial set of identifier information for a successful verification; through the connection over the first communication port, the logic circuit is to receive a new set of identifier information as a replacement of the initial set of identifier information; and the logic circuit is to replace the initial set of identifier information with the new set of identifier information in the memory. In one example, the logic circuit is capable to use the new set of identifier information on a first communication port to control media distribution over the first communication port; and the logic circuit is capable to use a copy protection protocol on the first communication port to control media distribution; and the new set of identifier information is to be secured in communication from the server to the device using the initial set of identifier information and the copy protection protocol. In another example, the device further includes a second communication port coupled with the logic circuit; the product is capable to use the new set of identifier information with a content protection protocol on the second communication port to protect content distributed through the second communication; and the new set of identifier information is to be secured in communication from the server to the device using the initial set of identifier information and the copy protection protocol. In one example of an embodiment, the logic circuit is to verify authenticity of the new set of identifier information using the initial set of identifier information (e.g., verifying that the new set of identifier information received at the device is digitally signed according to the initial set of identifier information). In one example of an embodiment, the logic circuit is to decrypt the new set of identifier information using a public key of the initial set of identifier information and to verify a digital signature signed using a private key of the initial set of identifier information.

The present invention includes methods and apparatuses which perform these methods, including data processing systems which perform these methods, and computer readable media which when executed on data processing systems cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

At least one embodiment of the present invention seeks to secure the process of configuring products (e.g., digital television receivers), in which information for authentication and for secure communication is individually loaded into each of the products (e.g., typical when the product is being produced at some stage of a manufacturing process). In one embodiment of the present invention, information for establishing a secure authenticated channel is installed into the products using a secure authenticated channel in a serialization process while the products are in a manufacture facility. In one embodiment of the present invention, the information for establishing a secure authenticated channel includes information for uniquely identify each of the products. In one embodiment, the same communication protocol and security techniques for establishing a secure authenticated channel for the protection of the contents transmitted over the insecure media are used to transmit the identifier information to the products for serialization. Since the same communication protocol and security techniques are used in the configuration process, the configuration information transmitted for serialization is protected at least to a level the contents are protected during the typical usage of the products.

Figure 2:
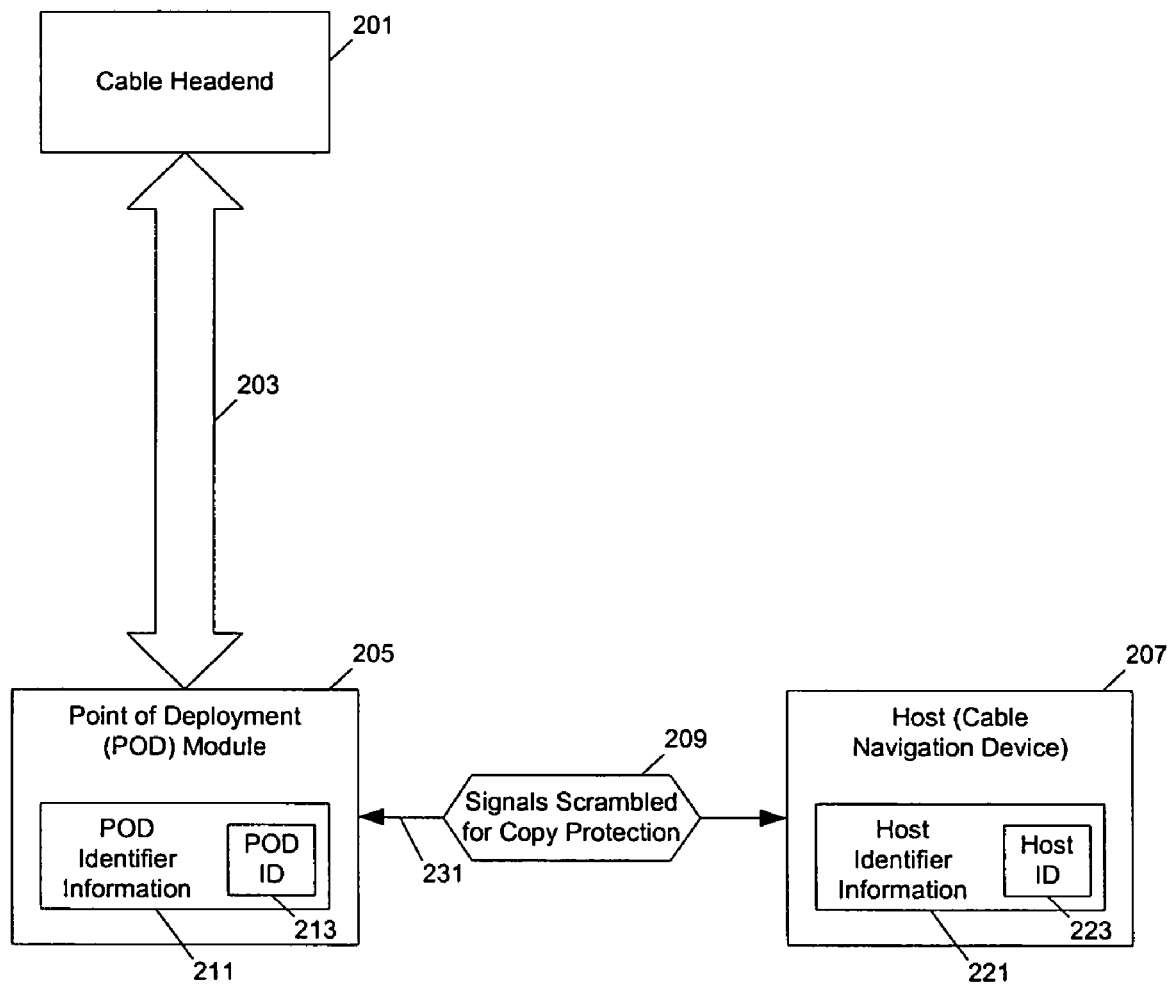
FIG. 2 shows a diagram of a system with a copy protection scheme which may be used with the present invention.

Some examples are illustrated through the copy protection system of a digital cable system. FIG. 2 shows a diagram of a system with a copy protection scheme which may be used with the present invention. In FIG. 2, a Point of Deployment (POD) module (205), which may be referred to as a Cable-CARD™ or other device, is used to receive the signals protected by a conditional access scrambling system from a cable headend (201). The cable headend (201) transmits the scrambled digital cable signals to the viewers through the communication system (203, such as a cable network). The POD module is capable of being instructed by the cable headend to descramble the received content and re-scramble the content for delivery to a host (207). The host (207) is a cable navigation device, such as a digital television set (or a set-top box). Each of the POD module and the host has an identity. Typically, the host has a unique identity; and the identity of the POD module is also typically unique. The unique identity of the host is implemented on the host so that it cannot be easily changed or cloned.

For example, the POD module (205) has POD identifier information (211) which includes a POD ID (213); and the host (207) has host identifier information (221) which includes a host ID (223). At least a portion of the identifier information is in the form of a digital certificate, signed by a certificate authority. Using a signature verification technique, the POD and the host verify each other's certificate. The POD ID and the host ID are then reported to the cable headend (201). The reporting of the POD ID and the host ID may be performed automatically through a two-way communication channel or manually (e.g., through a phone call to the operator of the cable company when the POD cannot communicate the POD ID and the host ID to the cable headend through the communication system (203)). If the host attached to the POD module is allowed to view the content, the cable headend transmits data to the POD so that the POD is allowed to remove the conditional access scrambling. For contents that need copy protection, the POD module (205) re-scrambles the content before delivery to the host (207). On the communication medium (231) between the POD module (205) and the host (207), the signals (209) are scrambled for copy protection. Further details about the security mechanisms for copy protection between the POD module (205) and the host (207) can be found in ANSI/SCTE 41 2003.

To protect the content against unauthorized access through the data path (231), the host (207) is capable of using the host identifier information (221) to establish a secure authenticated communication channel over the data path (231) between the POD module (205) and the host (207); and this channel is used to exchange session keys and content protection information. In one exemplary method, a session key is used to scramble data across the data path; and the content protection information is used to instruct the host what can be done with the content. In one embodiment of the present invention, the same capability of the host is used for the configuration of the host identifier information (221).

Typically, different hosts have different host IDs. When each of the hosts has a unique host ID, the access to the contents can be controlled based on the host ID. Thus, the hosts are typically assigned unique identities before being shipped to end-users. One embodiment of the present invention uses the built-in security capability of the hosts to communicate the unique identities from a server to the hosts through secure authenticated channels established over a communication medium which may not be physically secure. In this way, the identifier information is protected against unauthorized access during the serialization process.

Figure 3:
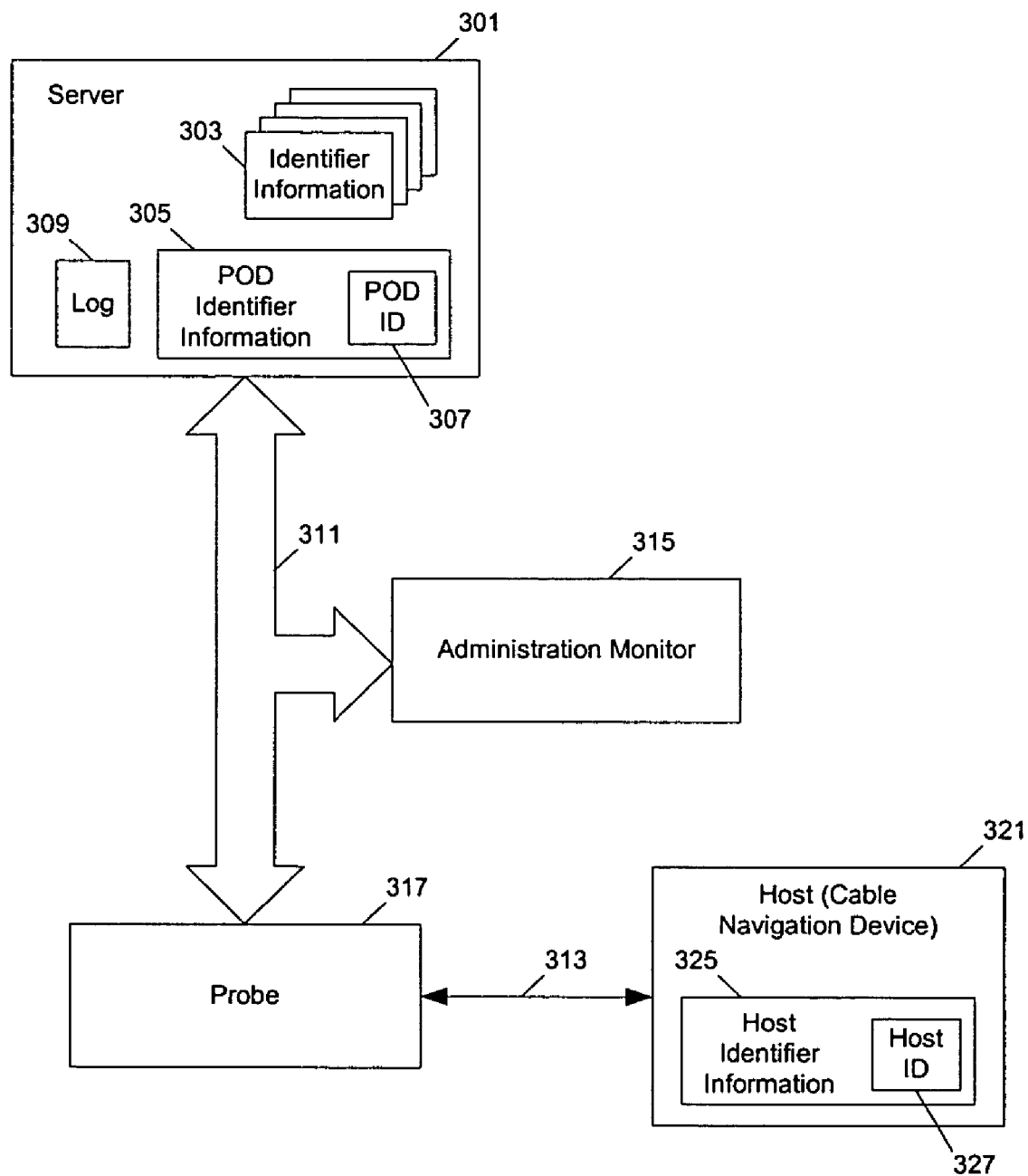
FIG. 3 shows a block diagram representation of a system for product serialization according to one embodiment of the present invention.

FIG. 3 shows a block diagram representation of a system for product serialization according to one embodiment of the present invention. In FIG. 3, a server (301) has unique identifier information (303) which is to be loaded into hosts. The host (321), such as a cable navigation device, may be one of the products on an assembly line. A probe (317) is used to physically connect the host (321) to the network (311), which further connects to the administration monitor (315) and the server (301). The probe connects the host (321) to the server and the administration monitor to perform various tests. An operator may use the administration monitor (315) to monitor the progress of the tests, the test results, as well as the progress of the serialization process. Confidential information (e.g., identifier information (303)) is stored in the server. The identifier information (303) is communicated to the host (321) only through a secure authenticated channel established using the POD identifier information (305) and the host identifier information (325). The secure authenticated channel is established over the network (311) and probe (317) using the copy protection mechanism that the host (321) uses to communicate with a POD security module.

In one embodiment of the present invention, a number of products are initially loaded with the same identifier information. Since these products have the same identifier information, a content provider (e.g., a cable television operator) cannot tell one host from another. Such configured products are normally not suitable for distribution to the end users. To serialize the products, each of these products is assigned unique identifier information so that a content distribution network can tell one host from another. Once the products are serialized, access to the contents can then be controlled based on the unique identifier information. In one embodiment of the present invention, the server (301) is connected through the probe (317), one at a time, to the products that are initially loaded with the same identifier information. In one embodiment, the probe (317) has the same physical interface (313) to the host (321) as the POD-host interface or it may have an alternative physical interface. After the probe is connected to the host (321), the firmware of the host (321) may be upgraded if necessary. Tests are performed on the host (321) to check if the host (321) functions properly.

Then, according to the POD-host communication protocol (e.g., copy protection protocol), a secure authenticated communication channel is established to communicate one of the unique identifier information 303 to the host (321). After the host (321) has the new, unique identifier information, the server recreates a secure authenticated communication connection with the host using the new identifier information and verifies that the host functions properly with the new identifier information. The server records on a log (309) the test results and the assignment of the new identifier information. The log (309) can be a file on the server or an entry of a database. Note that the log (309) can be maintained on a data processing system separate from the server (301). The log may include the information about the product, such as the serial number of the product. Some products have electronic serial numbers, which can be automatically collected and associated with the newly assigned identity information in the log. The server (301) may obtain the identifier information (303) from an online certification store, or a database on an intranet, or from a removable machine readable medium, such as an optical diskette or a removable disk drive.

In one embodiment of the present invention, one server (e.g., 301) can simultaneously control multiple probes (e.g., 317) for configuring multiple hosts (e.g., on multiple assembly lines). The probes have different identifiers (e.g., different network addresses) so that the server can maintain multiple separate simultaneous connections to multiple hosts that have the same initial identifier information. Each of the probes may be connected to a corresponding one of the administration monitors to display the test results and to show the progress in the configuration process. Alternatively, one administration monitor may be used to monitor the test results from several probes. The administration monitor may receive information directly from the probe, or indirectly from the server, or in combination to generate the display. When the server and the host establish a secure authenticated communication channel for assigning the identifier information, neither the probe (317) nor the administration monitor (315) (nor other devices attempting to spy) can gain access to the identifier information, since the identifier information is protected at least by the copy protection mechanism.

Figure 4:
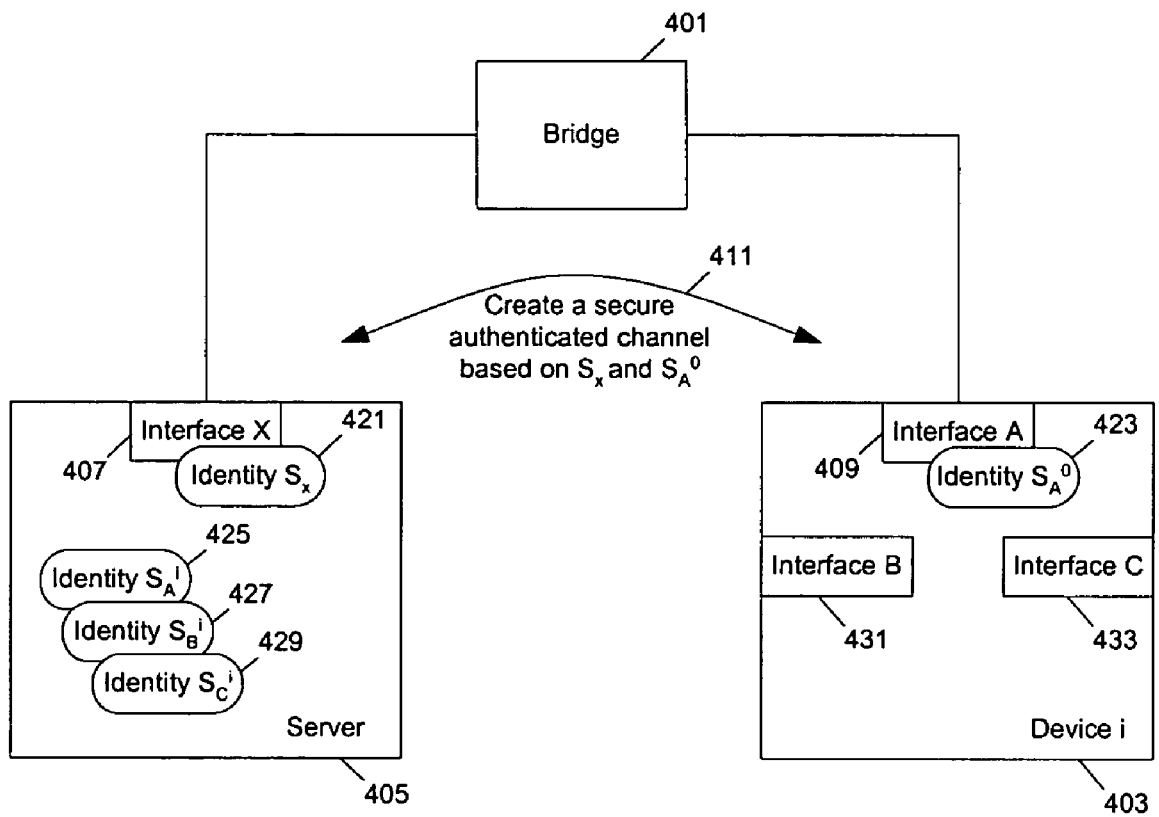
FIGS. 4-7 illustrate the process of product serialization according to one embodiment of the present invention.
Figure 5:
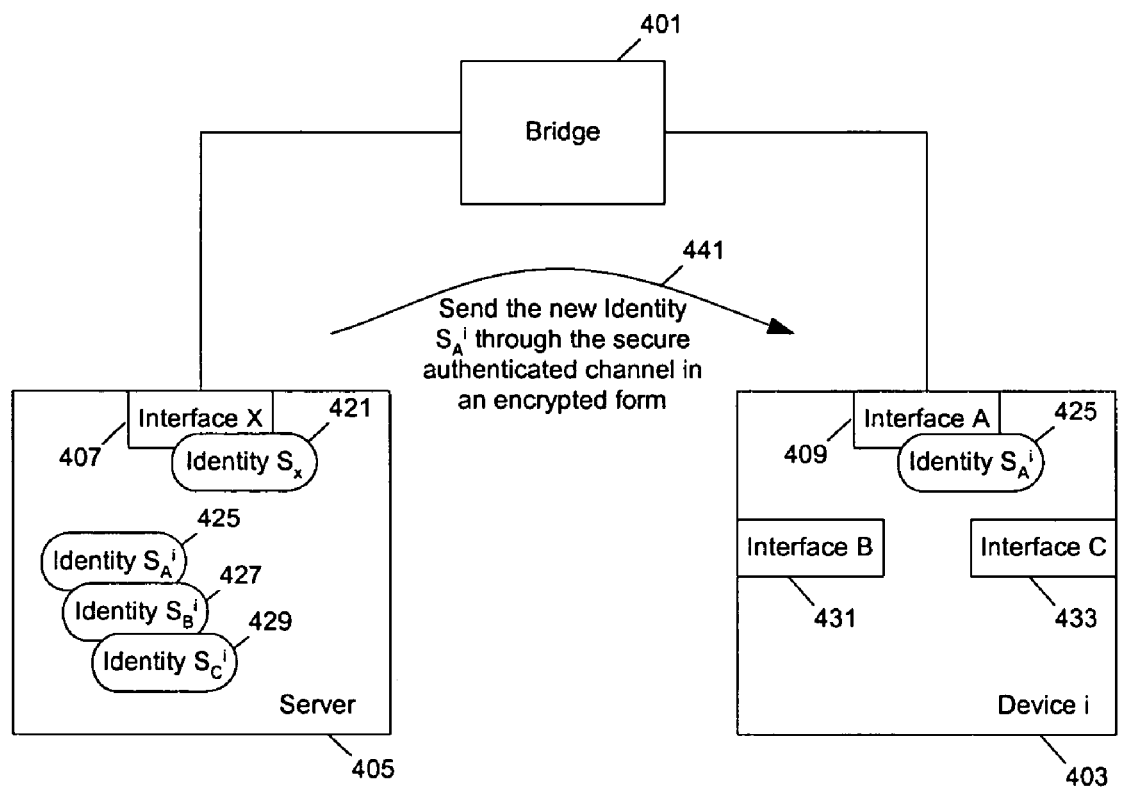

FIGS. 4-7 illustrate the process of product serialization according to one embodiment of the present invention. In FIG. 4, the device i (403) is initially loaded with an identity $S_A^o$ (423). The initial identity $S_A^o$ (423) can be the same for a number of devices (i=1, 2, ..., n). For example, a manufacture may assign each of the subcontractors one initial identity for their products. The manufacture may periodically (e.g., once a month) change the initial identity for the products; and the initial identity expires in a short period of time. In one embodiment of the present invention, the initial identity does not contain any secret information that is used in "real-life" service. For example, the initial identity does not contain the keys and the system parameters (e.g., those for Diffie-Hellman) that will be used in "real-life" service. Instead, a different set of keys and parameters may be used for configuration purpose only, which will not be valid in a real digital cable system. These keys and parameters may be generated on the server (405) for the configuration purpose only. Such keys and parameters are compatible with the security capability of the POD-host interface so that secure authenticated channels can be made using the same security capability of the POD-host interface for the serialization (e.g., loading the unique real-world identity into the device through the bridge (401) between the server (405) and the device (403)). The bridge may be simply a communication cable, or a path including a network (e.g., intranet or Internet). For example, in FIG. 3 probe (317) and/or a portion of the network (311) can be considered the bridge.

After the bridge (401) connects the server (405) to the device (403), the server and the device create (411, see FIG. 4) a secure authenticated channel based on the verification of the identities $S_x$ (421) and $S_A^o$ (423). In one embodiment of the present invention, the authentication process is performed as if the server were a POD module (from the host's point of view). The same security protocol and connection algorithm for POD-host binding is used to establish the secure communication channel over the bridge (401). The bridge (401) may not be physically secure. However, the security protocol and connection algorithm for the POD-host binding, which protect the cable content against unauthorized access in the copy protection system, are used to secure the data transferred over the bridge (401). Thus, a new identity can be securely sent over the bridge (401).

After the secure authenticated channel is established, the server sends (441, see FIG. 5) the new, unique identity $S_A^i$ (425) to the device (403) through the secure authenticated channel in an encrypted form over the bridge (401). Thus, the secret information for the identity $S_A^i$ is protected against unauthorized access during the transmission from the server to the device (403). On the device i (403), the new identity $S_A^i$ (425) replaces the initial identity $S_A^o$ (423). This replacement may involve erasing the initial identity; alternatively, this replacement may not erase the initial identity (e.g., it may be merely marked as "invalid" or "old").

Figure 6:
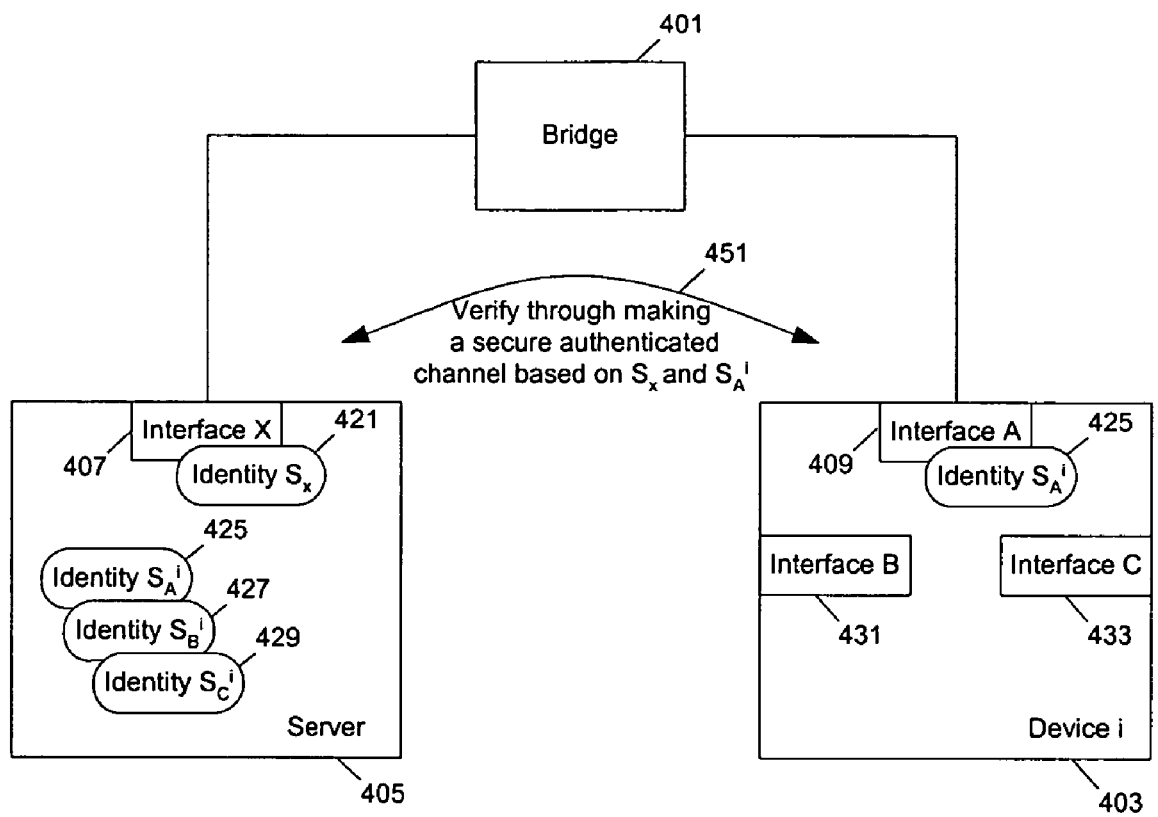
Figure 7:
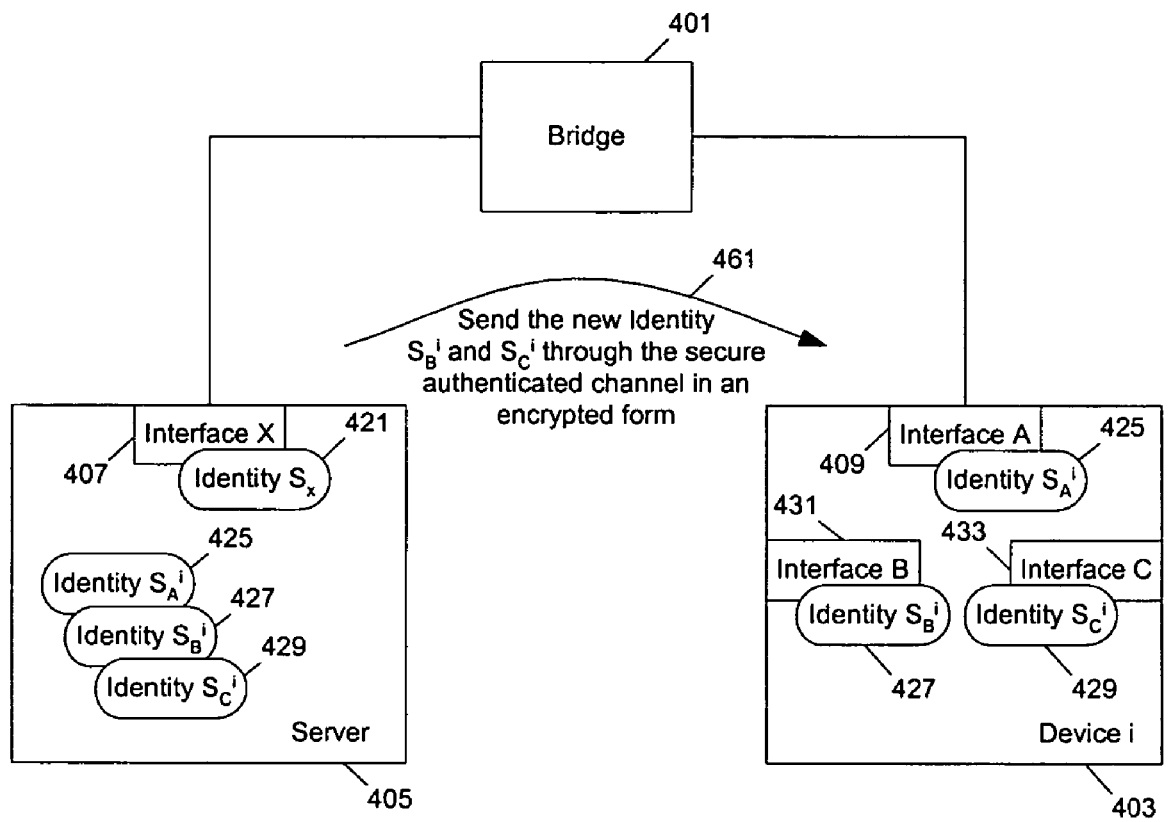
Figure 8:
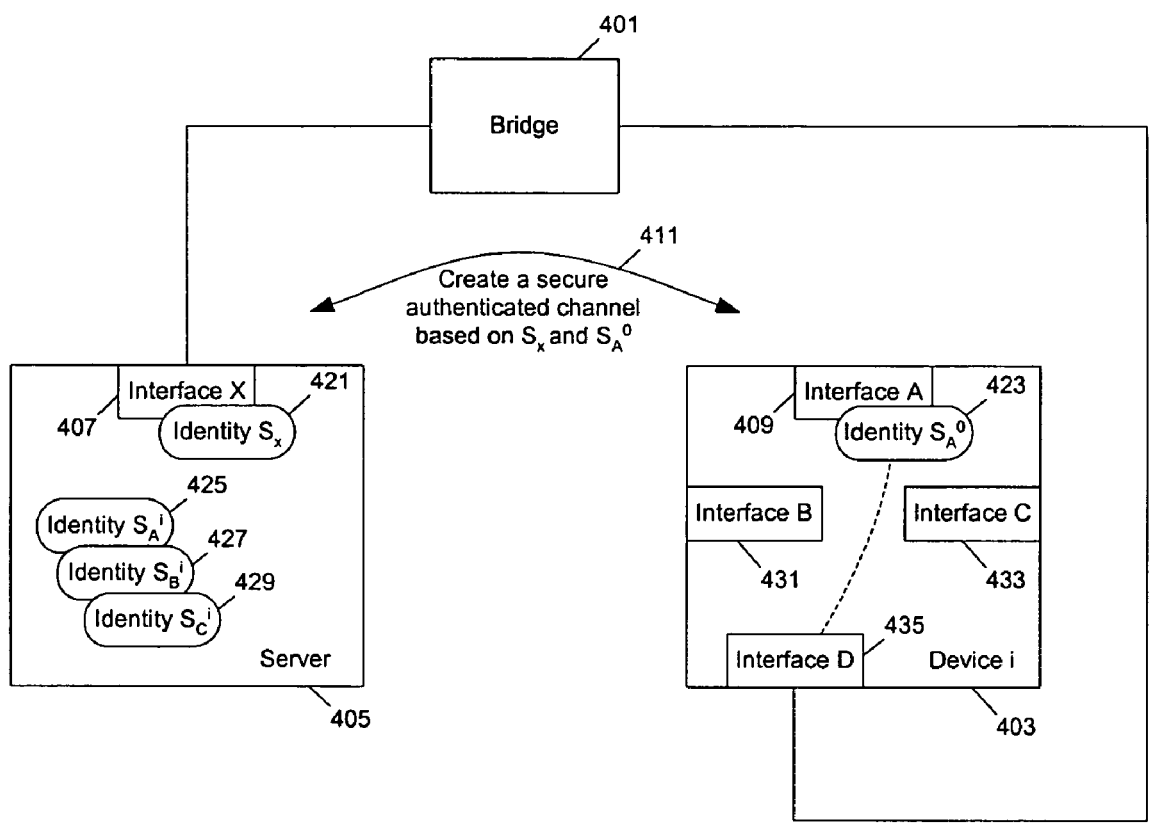
FIGS. 8-11 illustrate the process of product serialization according to another embodiment of the present invention.

After the device (403) assumes the new identity $S_A^i$ (425), the server (405) makes a new secure authenticated channel based on $S_x$ and $S_A^i$ to verify that the device (403) is functioning properly (451, see FIG. 6). In one embodiment of the present invention, the identities for the serialization process and the identities for the final products use different sets of parameters (e.g., public keys for signature verification and parameters for Diffie-Hellman key exchange). Thus, after the device assumes the new identity $S_A^i$ (425), the server uses a different identity (e.g., $S_x^d$) that is compatible with the new identity $S_A^i$ (425) during the verification process. Alternatively, the initial identity $S_A^o$ (423) may be such that the same identity $S_x$ can be used for connection with both $S_A^o$ (423) and $S_A^i$ (425).

In one embodiment of the present invention, the device (403) has multiple interfaces, such as interface A (409), interface B (431) and interface C (433). For example, a digital television set may have interfaces including: a CableCARD, cable (HFC, Hybrid Fiber Coax), an IEEE-1394 port, a Digital Video (DV) port (e.g., Digital Video Broadcasting Common Interface (DVB-CI)), an Ethernet port, etc. Each of the interfaces may need a separate unique identity (e.g., for copy protecting the content when transmitting from one port to another within the host, or when receiving at these ports, or when storing the content). Each of the physical interfaces may use a common security system with an associated identity. The security system and an associated unique identify can be used with one interface or other interfaces. A security system intended for one physically interface can be temporarily used with another physically interface (e.g., for serialization). The server (405) has unique identities (425, 427 and 429) for the interfaces (423, 431 and 433). After establishing a secure authenticated channel over the bridge (401), such as using $S_x$ and $S_A^o$ (or $S_x$ and $S_A^i$), identities $S_B^i$ (427) and $S_C^i$ (429) can also be sent securely (461, see FIG. 7) over the bridge (401) to the device (403) for installation.

Alternatively, one certificate, which is compatible with a POD security module, may be designated as the initial identity. Further, such a certificate can be used with a POD module to perform serialization while the product is in the possession of an end user. This serialization may occur when initially possessed or after a period of possession (e.g., for upgrading an identity of a host in the field which is being used by a user, such as when the lifetime of the certificate has expired or when some copy protection secrets need to be renewed). For example, a POD module according to one embodiment of the present invention can be used to descramble a new set of identifier information transmitted from a cable headend for the POD module and to securely transfer the identifier information to the host, when the POD module determines that the host is a legitimate one for serialization. The POD module may automatically request for the new set of identifier information; alternatively, the POD module may cause the user to manually report the POD ID and Host ID (e.g., a cable company) to get a new set of identifier information installed into the host.

Figure 9:
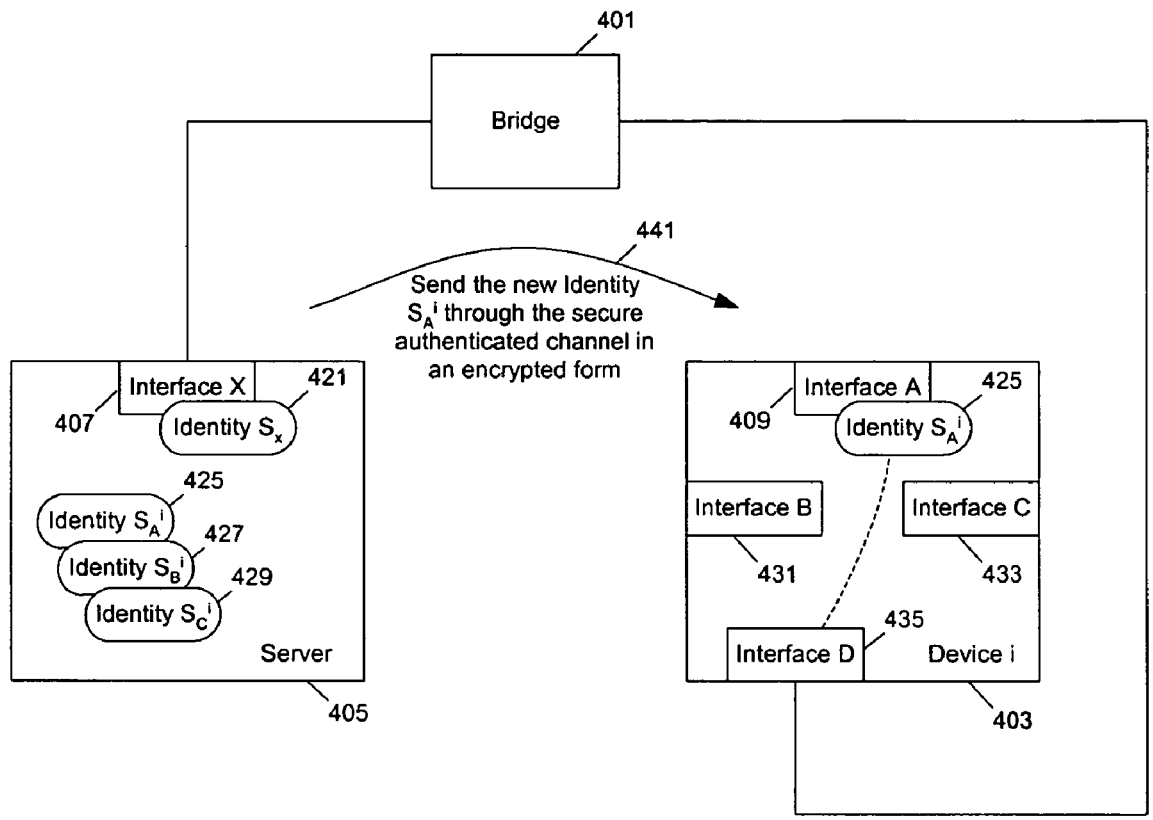
Figure 10:
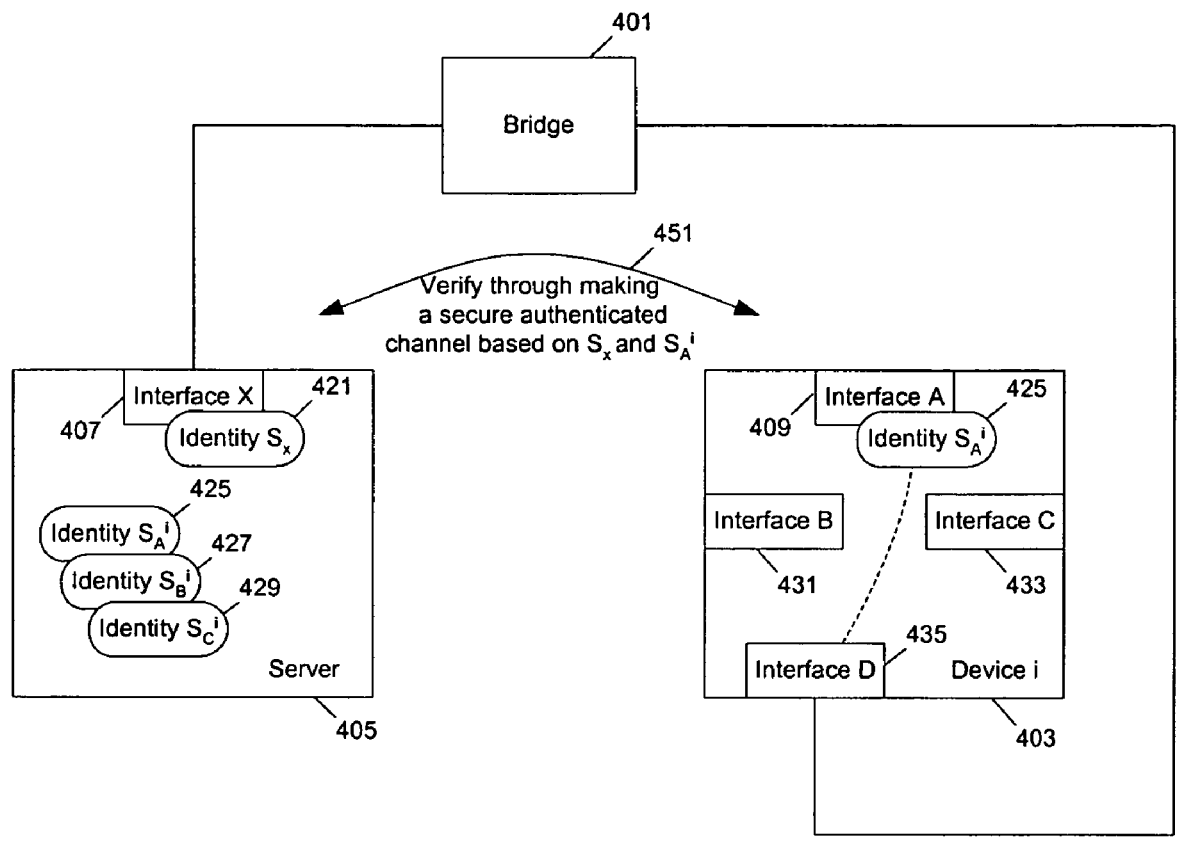
Figure 11:
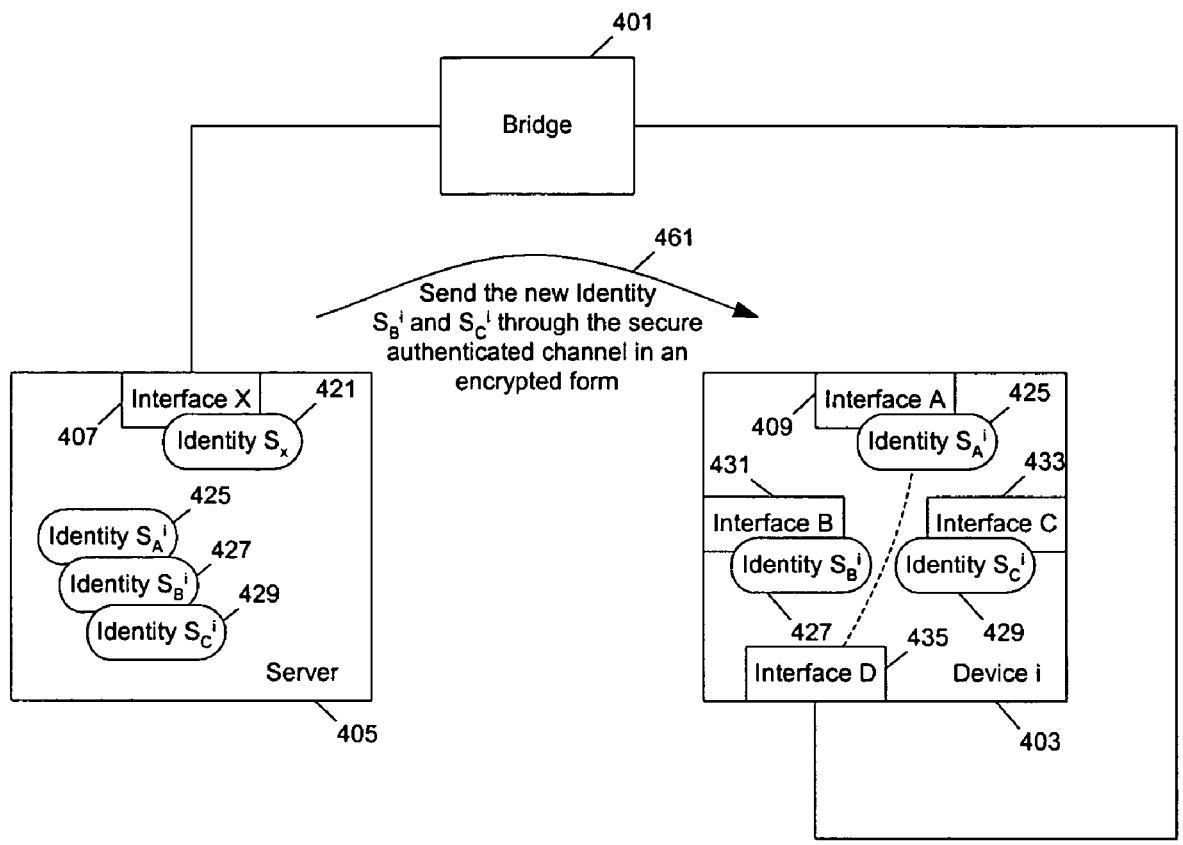

FIGS. 8-11 illustrate the process of product serialization according to another embodiment of the present invention. In FIGS. 8-11, the security system (e.g., copy protection protocol) intended for one physical interface (e.g., POD or Cable-CARD) is used on another physical interface (e.g., Ethernet) to serialize the product. For example, in FIG. 8, the device (403) is initially loaded with identity $S_A^o$ (423) for interface A (409). A copy protection communication protocol is implemented on the device for interface A (409) using identity $S_A^o$ (423). Interface D (435) (e.g., an Ethernet port) may or may not have a copy protection communication protocol implemented. In one embodiment of the present invention, the copy protection communication protocol designed for interface A (409) and its associated initial set of identity $S_A^o$ (423) are used on interface D to create (411) a secure authenticated channel over the bridge (401) between the server (405) and the device (403). In FIG. 9, the new identity $S_A^i$ (425) for interface A (409) is sent (441) from the server (405) to the device (403) through the secure authenticated channel in an encrypted form using interface D (435), where the secure authenticated channel is based on the copy protection communication protocol for interface A (425) and the initial set of identity $S_A^0$ (423). In FIG. 10, the server verifies (451) the new identity of the device for interface A (409) through making a secure authenticated channel using interface D (435) and the copy protection communication protocol for interface A (425). Alternatively, the verification can be performed through a direct connection to interface A (425). The identity information can be designed so that the same identity $S_x$ (421) can be used in the server to connect to the device with the new identity. Alternatively, the initial identity and the new identity can be designed to have different sets of shared secrets so that after the new identity is installed on the device, a different identity compatible with the new identity is used at the server to make a secure authenticated channel after the new identity is installed on the device. FIG. 11 illustrates the loading of new identities $S_B^i$ (427) and $S_C^i$ (429) for interfaces B (431) and C (433) through interface D (435) using the copy protection communication protocol for interface A (425) and the identity intended for interface A. In one embodiment of the present invention, a device has multiple copy protection communication protocols for multiple physical interfaces respectively; and one of the multiple copy protection communication protocols and its associated initial identity can be selected to use on any of the physical interfaces for the serialization of the device.

Figure 12:
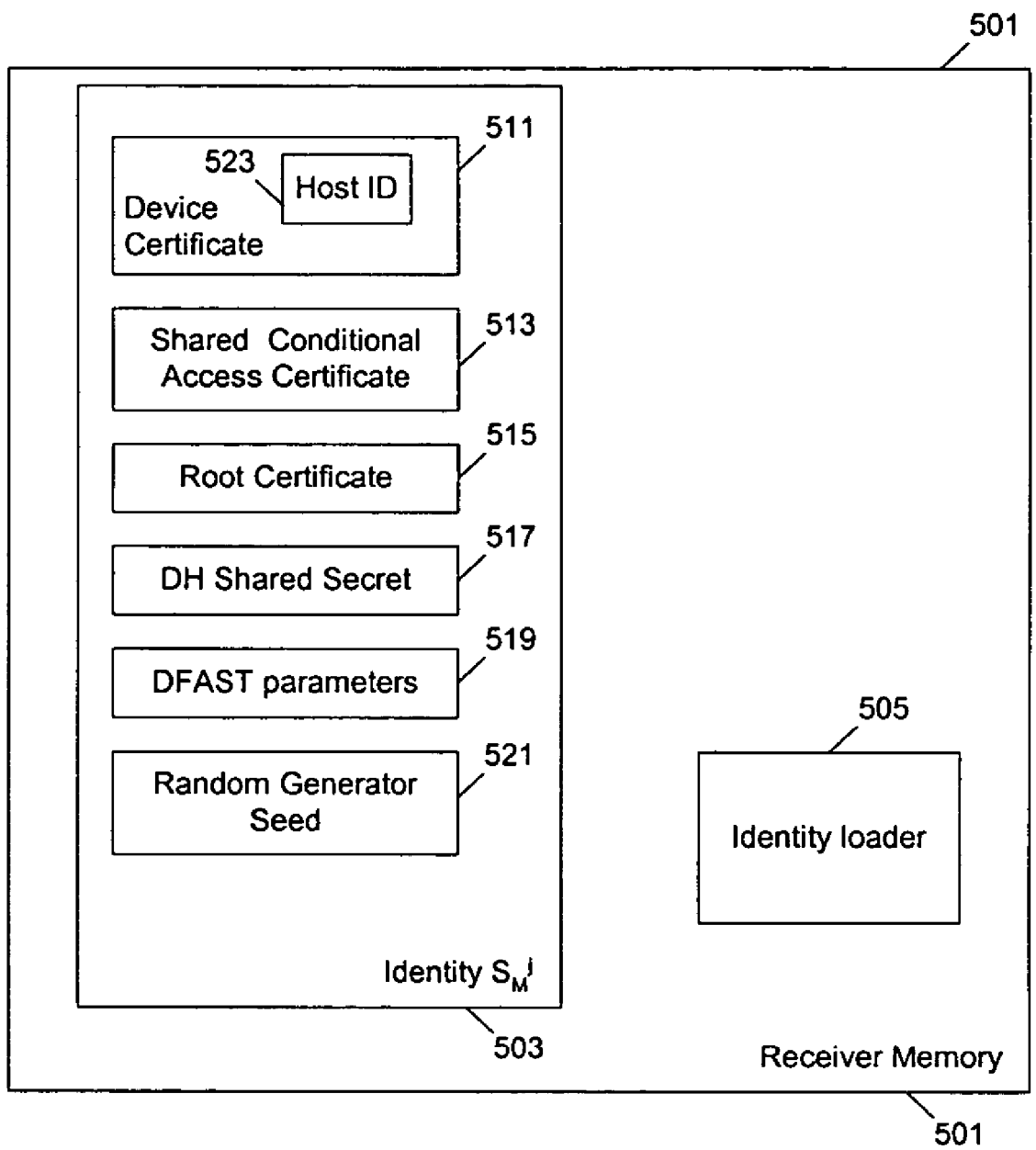
FIG. 12 illustrates the memory of a receiver according to one embodiment of the present invention.

FIG. 12 illustrates the memory of a receiver according to one embodiment of the present invention. A digital television receiver (e.g., 321 in FIG. 3 or 403 in FIG. 4) stores an identity loader (505) in the receiver memory (501). After the receiver obtains new identifier information (e.g., through the secure authenticated channel), the identifier loader (505) is then executed to replace the initial identifier information with the new identifier information.

As illustrated in FIG. 12, identifier information may include a device certificate (511), such as a certification in accordance with an International Telecommunication Union Telecommunication Standardization Sector (ITU-T) recommendation X.509 standard. The host ID (523) in the device certificate (511) of a production identity is used to identify the device. The host ID (523) of an initial identity can be chosen to indicate that the device is not serialized. In one embodiment, the device certificate (511) of the initial identity is not signed by a well known certificate authority; instead, the device certificate (511) of the initial identity is signed by a private key of the configuration server so that the device certificate (511) of the initial identity will not be accepted by a POD security module.

The identity $S_M^j$ (503) may include secret information, such as Diffie-Hellman (DH) shared secret (517), DFAST (Dynamic Feedback Arrangement Scrambling Technique) parameters (519), random generator seed (521). The identity $S_M^j$ may further include information, such as shared conditional access certificate (513) and root certificate (515). In one embodiment of the present invention, the secret information of the identity is maintained in the receiver memory (501) by a software program (not shown in FIG. 12) in an encrypted form to prevent unauthorized access.

The identity $S_M^j$ (503) is typically stored in a non-volatile memory of the receiver, such as a flash memory integrated circuit. The memory may further store the instructions for processing multimedia signals, such as firmware, including the identity loader (505).

Figure 13:
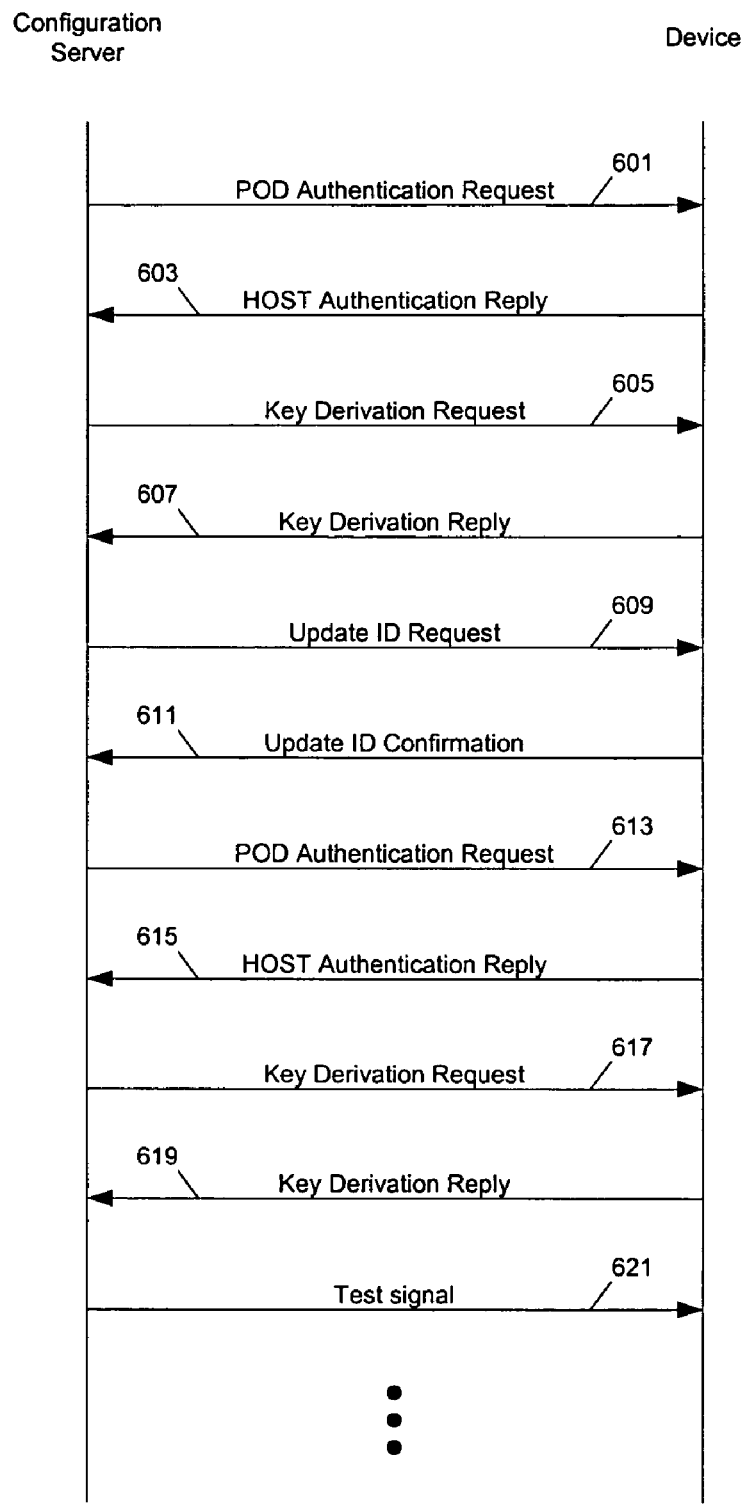
FIG. 13 illustrates the messages transmitted between a configuration server and a device to be configured according to one embodiment of the present invention.

FIG. 13 illustrates the messages transmitted between a configuration server and a device to be configured according to one embodiment of the present invention. In one embodiment of the present invention, the configuration server (e.g., 301 in FIG. 3 or 405 in FIG. 4) emulates a POD module to communicate with the device (e.g., 321 in FIG. 3 or 403 in FIG. 4) using the POD-host protocol in a POD copy protection system (e.g., as specified in ANSI/SCTE 41 2003). The server sends a POD authentication request (601) to the device; and the device sends a HOST authentication reply (603) back to the server. It is understood that the POD authentication request (601) and the HOST authentication reply (603) are used to represent the messages exchanged for the authentication process, which may include the exchange of a number of messages. For example, the authentication process may include the exchange of device certifications and the exchange of messages for the verification of an authentication key to resist "Man in the Middle" attacks.

The configuration server sends a key derivation request (605) to the device; and the device sends a key derivation reply (607) back to the configuration server. Through key derivation messages, the server and the device can derive a shared secret session key (e.g., according to Diffie-Hellman) for the secure exchange of further messages.

The configuration server sends an update ID request (609) to the device using the secure communication channel established through the authentication messages and the key derivation messages. The update ID request includes the new identification information transmitted in an encrypted format to the device. After the device successfully changes its identifier information (e.g., using the identity loader (505) in FIG. 12), the device sends an update ID confirmation (611) back to the configuration server.

Once the device has the new identity installed, the configuration server can test the device. The configuration server emulates a POD security module to make a secure authenticated connection with the device through sending a POD authentication request (613), receiving a HOST authentication reply (615), sending a key derivation request (617) and receiving a key derivation reply (619). If the secure authenticated connection to the device with the new identifier information is successful, the configuration server sends test signals (scrambled for copy protection) to the device (621), emulating a POD security module providing the scrambled signals to the device according to the copy protection system. The device may be shipped to the end users if the device passes the test.

Figure 14:
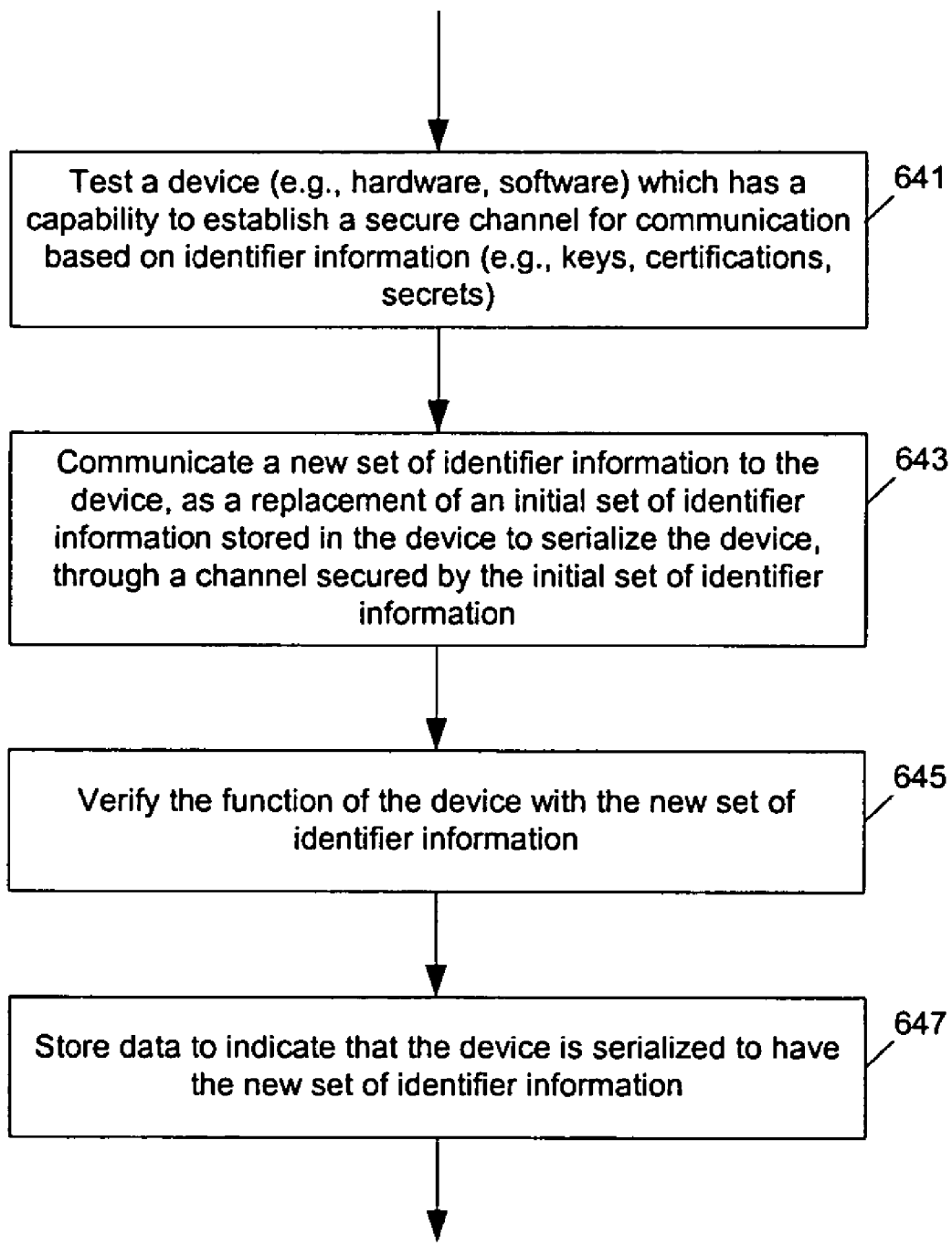
FIG. 14 shows a flow chart of a method to configure a device according to one embodiment of the present invention.

FIG. 14 shows a flow chart of a method to configure a device according to one embodiment of the present invention. Operation 641 tests a device (e.g., hardware, software) which has a capability to establish a secure channel for communication based on identifier information (e.g., keys, certifications, secrets). The device can be tested for hardware functionality and software/firmware integrity. For example, during a software test, the version number of the software/firmware can be checked. If the software/firmware installed on the device is outdated, the current version of the software/firmware is loaded into the device. Operation 641 may be done before operation 643 or after operations 643, 645 and/or 647. Operation 643 communicates a new set of identifier information to the device, as a replacement of an initial set of identifier information stored in the device to serialize the device, through a channel secured by the initial set of identifier information. Operation 645 verifies the function of the device with the new set of identifier information. The verification process may include the verification of the new identity information and further testing of the device. At least some of the tests can be performed either before or after the serialization. Operation 647 stores data to indicate that the device is serialized to have the new set of identifier information. The data may include the serial number (or an electronic serial number) of the device the initial set of identifier information and the new set of identifier information. The data may be maintained in a database for a period of time (e.g., 25 years). Some of the tests of the device can be performed before the serialization or after the serialization.

The serialization can be performed during the final assembly phase, in which the entire product is assembled. After the serialization and testing, the products may be ready for delivery to users. Alternatively, the serialization can be performed during the subassembly phase, in which only a portion of the final product is assembled. For example, after the data processing module of a digital television set is assembled (e.g., without the screen and a power supply and a few other components), the data processing module can be tested and serialized. After the serialization and testing of the data processing module, a final assembly phase may be required to assemble the complete digital television sets before delivery to users. Thus, the serialization can be performed before or after the final assembly and may be performed before or after the delivery of the product. If the product fails a test, the product is not serialized or delivery to users.

Figure 15:
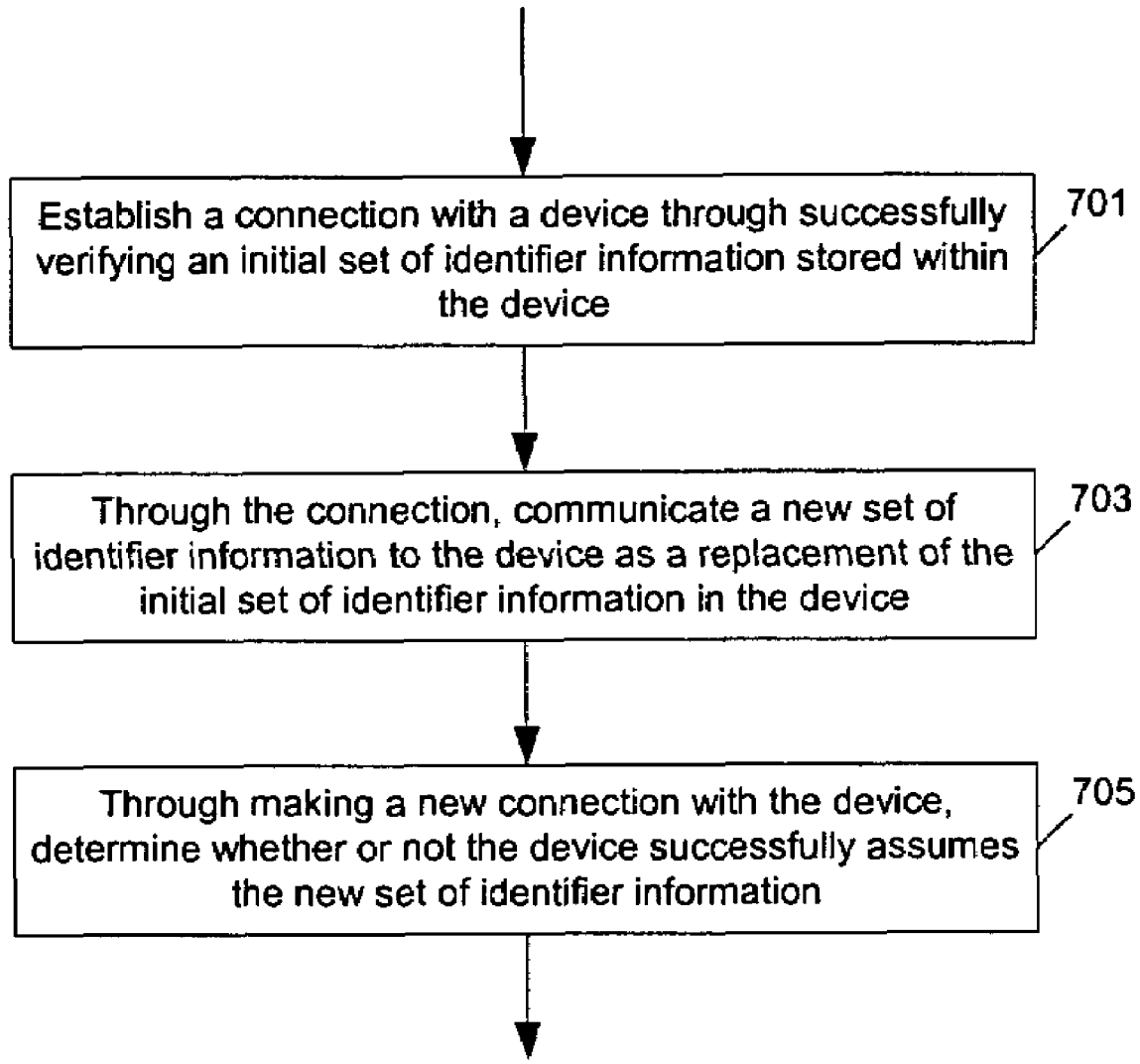
FIG. 15 shows a flow chart of a method of a server configuring a device according to one embodiment of the present invention.

FIG. 15 shows a flow chart of a method of a server configuring a device according to one embodiment of the present invention. Operation 701 establishes a connection with a device through successfully verifying an initial set of identifier information stored within the device. Through the connection, operation 703 communicates a new set of identifier information to the device as a replacement of the initial set of identifier information in the device. Through a new connection with the device, operation 705 then determines whether or not the device successfully assumes the new set of identifier information. The successful assignment of the new set of identifier information to a device can be logged in a file or in a database.

Figure 16:
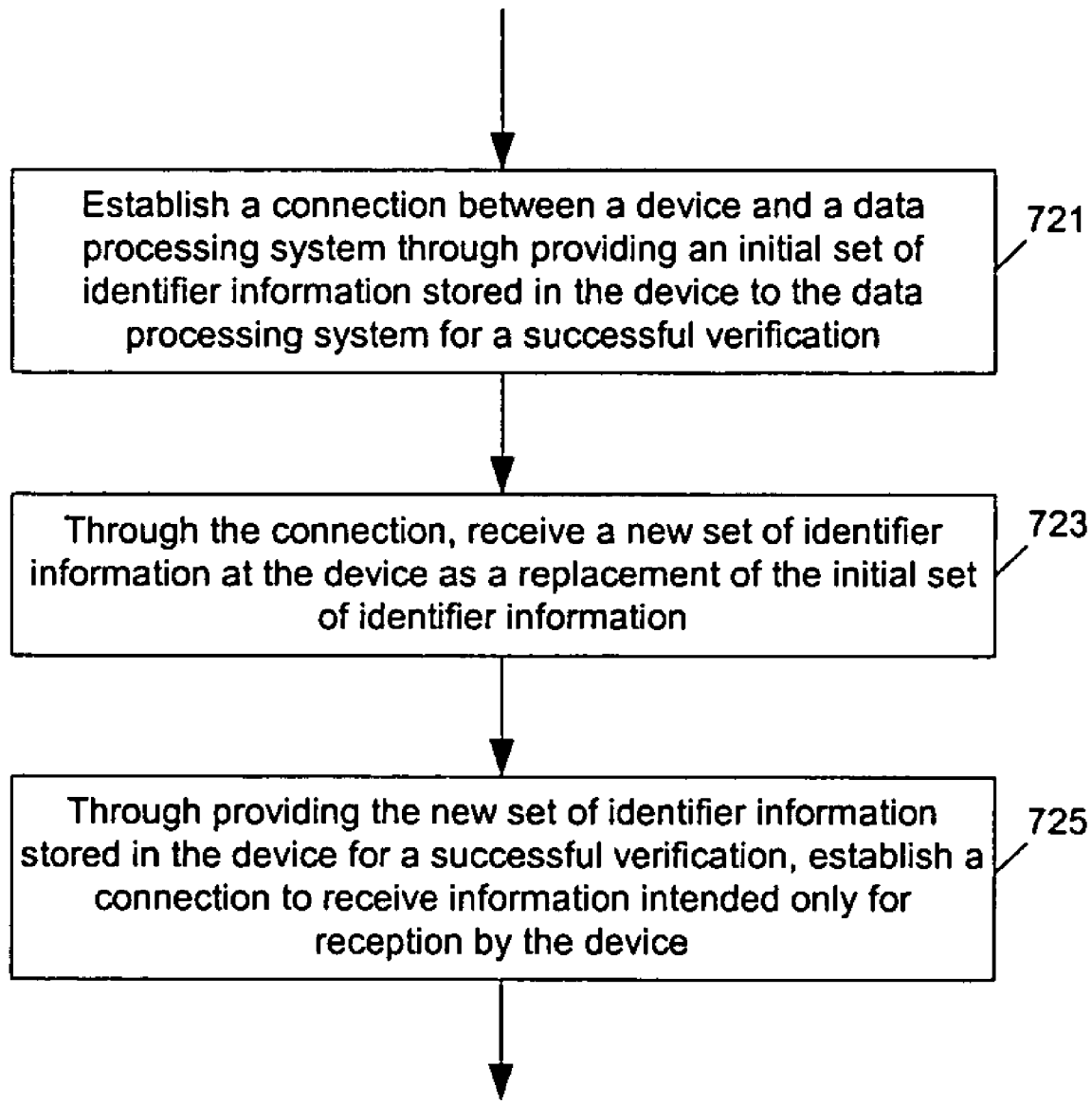
FIG. 16 shows a flow chart of a method of a device changing identity according to one embodiment of the present invention.

FIG. 16 shows a flow chart of a method of a device changing identity according to one embodiment of the present invention. Operation 721 establishes a connection between a device and a data processing system through providing an initial set of identifier information stored in the device to the data processing system for a successful verification. Through the connection, operation 723 receives a new set of identifier information at the device as a replacement of the initial set of identifier information. Through providing the new set of identifier information stored in the device for a successful verification, operation 725 establishes a connection to receive information intended only for reception by the device. The connection made through the new set of identifier information may be for the verification purpose or for use with "real-life" usage.

Figure 17:
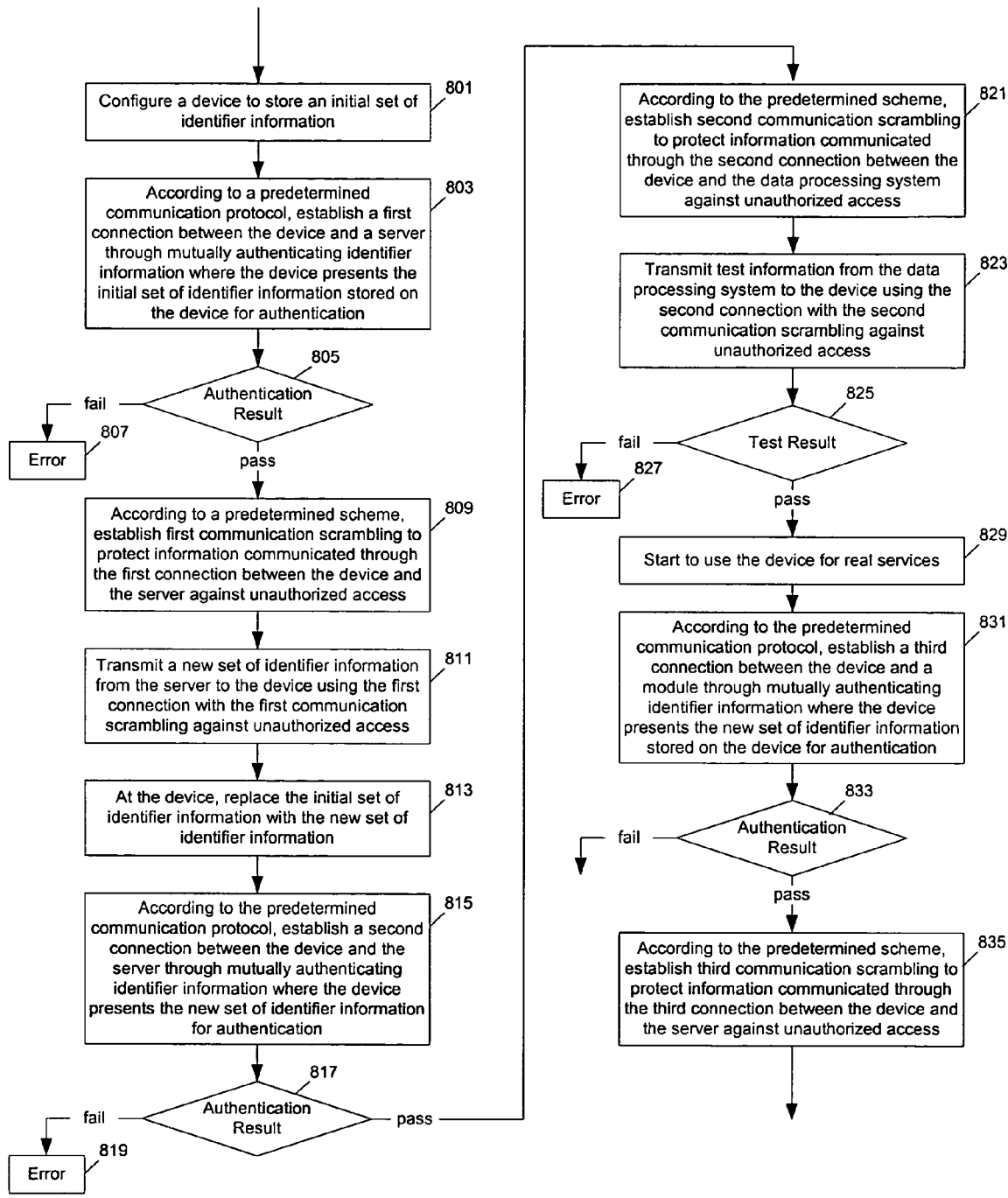
FIG. 17 shows a detailed example of product serialization according to one embodiment of the present invention.

FIG. 17 shows a detailed example of product serialization according to one embodiment of the present invention. Operation 801 configures a device to store an initial set of identifier information. The initial set of identifier information can be assigned to a large number of devices. Since the initial set of identifier information is not intended for "real-life" usage, multiple devices can share the same identifier information. To individually identify each of the devices, a serialization process is performed. According to a predetermined communication protocol, operation 803 establishes a first connection between the device and a server through mutually authenticating identifier information where the device presents the initial set of identifier information stored on the device for authentication. The server does not serialize the product if the product cannot show that it is a product to be initialized. The product refused to be initialized if the server cannot show that it is a legitimate server for serializing products. Thus, the process continues according to the authentication result (805). If the authentication fails, there is an error (807, e.g., error in the server or in the product); otherwise, according to a predetermined scheme, operation 809 establishes first secure authenticated channel (with communication scrambling, e.g., encryption) to protect information communicated through the first connection between the device and the server against unauthorized access. Operation 811 transmits a new set of identifier information from the server to the device using the first connection with the first secure authenticated channel (with communication scrambling) against unauthorized access. At the device, operation 813 replaces the initial set of identifier information with the new set of identifier information.

After the device installs the new set of identifier information, according to the same predetermined communication protocol, operation 815 establishes a second connection between the device and the server through mutually authenticating identifier information where the device presents the new set of identifier information for authentication. The process continues according to the authentication result (817). If the authentication failed, there is an error (819) during the serialization; otherwise, according to the predetermined scheme, operation 821 establishes second communication scrambling to protect information communicated through the second connection between the device and the data processing system against unauthorized access. Operation 823 transmits test information from the data processing system to the device using the second connection with the second communication scrambling against unauthorized access. The process then continues according to the test result (825). If the test failed, there is an error (827) in the system; otherwise, the device may be used for real services (829).

When the product is used for real services, according to same the predetermined communication protocol, operation 831 establishes a third connection between the device and a module through mutually authenticating identifier information where the device presents the new set of identifier information stored on the device for authentication. The process continues according to the authentication result (833). If the authentication failed, the device cannot be connected to the module to receive contents; otherwise, according to the predetermined scheme, operation 835 establishes third communication scrambling to protect information communicated through the third connection between the device and the server against unauthorized access. The device can then receives contents according to the third communication scrambling from the module.

Thus, at least some embodiments of the present invention provide methods to securely serialize devices that include one or more content protect mechanisms for the content transmitted over a data path. The content protect mechanisms require the storage of unique per device secrets in the devices. Embodiments of the present invention make use of the content protect mechanisms to create a secure authenticated channel between a server and the device and securely transfer the unique per device secrets into the device through a data path suitable for product serialization. In one embodiment of the present invention, the server enumerates itself as a legitimate content source to deliver the unique per device secrets into the device in a fashion as secure as the delivery of the content. In one embodiment of the present invention, when the secure channel is established, the server delivers, in an encrypted form the unique secrets for all the content protection mechanisms of the device. In one embodiment of the present invention, once the protection mechanisms have been updated with their unique secrets, the server recreates the secure channel for verification purposes.

Note that the image loader (505) and the configuration server may implement an additional layer of protocol and/or data encryption/scramble scheme to enhance security. Note that, in FIG. 3, both identifier information (303), as the content to be delivered to the host (321), and the POD identifier information (305) are on the server (301). It is understood that the server (301) can use both the content protection measures of the POD module (205) and the content protection measures of the cable headend (201). For example, the server (301) may check the pair of the POD ID (301) and the Host ID (327) to determine if the new set of identifier information can be transmitted to the host. Alternatively, in one embodiment of the present invention, the POD identifier information is implemented on a POD module, instead of on a server; and the server communicates to the POD module using a security mechanism that is used to protect the content on the cable distribution system (e.g., 203 in FIG. 2). The server may perform additional authentication operations to enhance security for the serialization.

The above examples are illustrated as a process in a manufacture facility, where testing and serialization are performed at the same time (e.g., on an assembly line). It is understood that the serialization process is not limited to the manufacture facility. For example, the products may be initialized with the initial set of identifier information, which is compatible with typical POD security modules. When it is determined that the product is not serialized and serialization is required to access certain content (e.g., particular set of channels that require copy protection), the serialization of the product may then start. The unique identifier for the product can then be securely transmitted to the product for installation using the initial set of identifier information. Thus, the product can be serialized on demand.

Further, the process can also be used to change the identity of the product (e.g., for renewability) or for upgrading or downgrading the product after the product has been used (e.g., by an end user) after it was manufactured. For example, new unique identify information can securely replace the old unique identify information using the old unique identify information, when the certification expires or when new secret parameters are used.

Figure 18:
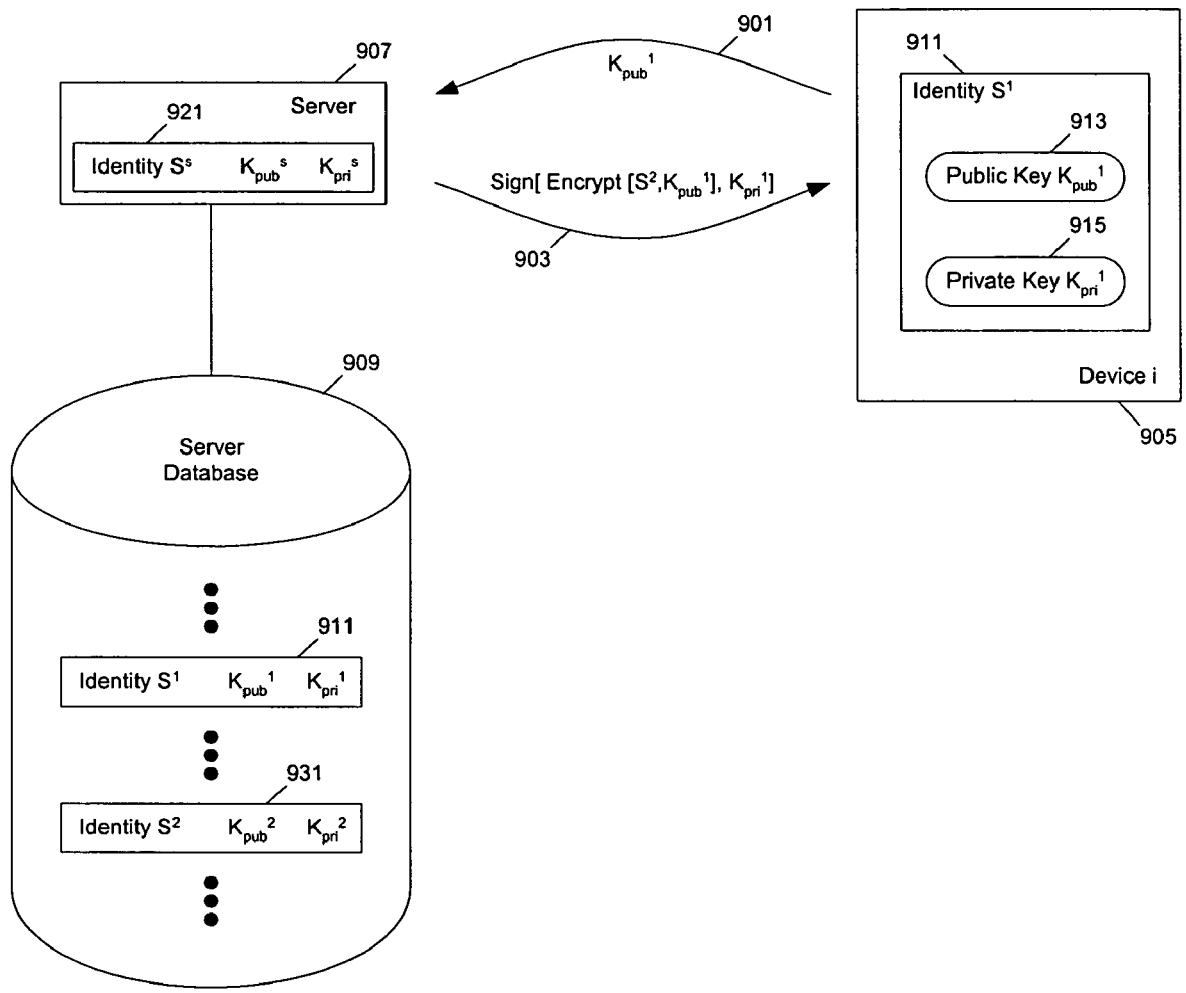
FIG. 18 shows a method to enhance security in the serialization of a device according to one embodiment of the present invention.

In one embodiment of the present invention, a further authentication process is implemented to prevent unauthorized changes to the identity of the product. For example, the device verifies that the new identity is from a server in possession of a secret of the device before using the received new identity to replace its current identity. FIG. 18 shows a method to enhance security in the serialization of a device according to one embodiment of the present invention.

In FIG. 18, the device (905) has identity $S^1$ (911) which includes public key $K_{pub}^1$ (913) and private key $K_{pri}^1$ (915). In the process of changing the identity of the device, the device (905) sends the public $K_{pub}^1$ (913) to the server (907). The server sends (901) the new identity $S^2$ (931) to the device to change its identity from identity $S^1$ (911) to identity $S^2$ (931). To ensure the authenticity of the new identity information received at the device (905), the device (905) verifies that the new identity information is properly signed. In one embodiment of the present invention, the new identity is to be signed using the private key $K_{pri}^1$ (915) of the current identity of the device. Since the server has access to the records of the identities assigned to different products, the server can look up from the server database (909) the private key $K_{pri}^1$ (915) of the device based on the public $K_{pub}^1$ (913). The private key $K_{pri}^1$ (915) is not sent from the device. The new identity can be encrypted using the public key $K_{pub}^1$ (913) of the current identity of the device or a dynamically generated session key of the secure authenticated channel. The server can sign the new identity using the private key $K_{pri}^1$ (915) of the current identity of the device. When the device receives (903) the encrypted and signed new identity, the device (905) can verify the authenticity using the public key $K_{pub}^1$ (913) of the current identity of the device and decrypt it using the private key $K_{pri}^1$ (915) of the current identity of the device. Thus, the server stamps the new identities according to the secrets in the old identities for the authentication of the new identities. Since the old identities of the devices in the field have unique private keys, the new identities are signed differently for different devices in the field. Since the digital signature signed using the private key $K_{pri}^1$ (915) cannot be forged without the knowledge of the private key $K_{pri}^1$ (915), an attacker cannot intercept the new identity and substitute it with another identity. Since a digital signature signed using the private key $K_{pri}^1$ (915) is required, only the server with the prior knowledge about the private key $K_{pri}^1$ (915) is allowed to change the identity of the device (905). Other secrets in the current identity $S^1$ (911) can also be used to stamp the new identity $S^2$ (931) to prove that the received new identity $S^2$ (931) is authentic and is from a legitimate source. Alternatively, the new identity sent from the server (907) to the device (905) may be signed using the private key of the identity $S^s$ (921) of the server (907) for authenticity.

The process may also be used for repair purpose. For example, if the device losses its old unique identifier information, the device may be first reloaded with an initial set of identifier information and the identity loader. Then, after the system passes an integrity test, a new set of unique identifier information can be securely loaded into the product. In one embodiment of the present invention, the product always stores an initial set of identifier information. When the product is reset, the initial set of identifier information is loaded so that the product can be securely serialized through the use of the initial set of identifier information.

Although the above examples illustrate the serialization of hosts (e.g., digital television sets, set-top boxes, etc.) for digital cable systems, it is understood that the methods of the present invention can also be applied to the configuring of other types of products, such as satellite television systems or others. The methods can be used for configuring products that have a media playback security mechanism or a copy protection mechanism. For example, portable media players may have a media copy protection mechanism based on digital certificates for individually identifying the portable media players. The portable media players may receive content through wireless connections, such as cellular telecommunications links (e.g., in accordance with GSM (Global System for Mobile communications) or CDMA (Code Division Multiple Access), etc), wireless local area network (e.g., in accordance with IEEE (Institute of Electrical and Electronics Engineers) 802.11), or wireless personal area network (e.g., in accordance with IEEE 802.15 or Bluetooth). The portable media players may or may not have ports for wired connections. Unique identifier information may be used for securely deliver the content over the insecure wired or wireless connection. The unique identifier information for the portable media players can also be configured using an initial set of identifier information.

Further, for example, multimedia cell phones (or other handheld devices, such as a handheld computer) can have certificates for media playback or for copy protection. Multimedia cell phones may receive media information through cellular telecommunications links, or WiFi (wireless local area network) or Bluetooth. Media playback certificates or copy protection certificates can be used to control the distribution of valuable contents so that only legitimate devices can have access to the contents. According to embodiments of the present invention, a serialization/configuration process can make use of the content protection mechanism for loading corresponding unique certificates into these devices.

Similarly, multimedia computers (e.g., notebook computers, desktop computers, handheld computers, etc.) can also receive content information through various data paths, such as Internet, Ethernet, USB (Universal Serial Bus), PCI (Peripheral Component Interconnect), PCMCIA (Personal Computer Memory Card International Association) card, WiFi, or Bluetooth, etc. A playback certificate or a copy protection certificate may be implemented on a network device, on a graphics card, or using software through the execution by the microprocessor. The assignment of a unique certificate can also be performed through the use of an initial set of certificates and the built-in security mechanisms.

Similarly, the methods according to embodiments of the present invention can also be used with other multimedia devices, such as digital cinema projectors. The projectors may have playback certificates or copy protection certificates for the protection of content distribution. A projector may receive media streams from wired network connections, such as Internet, Ethernet, or wireless connections, such as cellular links or WiFi.

Further, the certificates may be used to authorize the use of software programs on a computer. For example, installed software programs can be serialized before they can be used. A security mechanism to authenticate the serialized software can be used to serialize the installed software. Further, when the configuration of the computer is changed, the certificate may be updated in a way secured through the use of the previous certificate.

The methods of the present invention can also be used with other types of devices, such as radio receivers, navigation systems, access control and security systems of cars or homes or other property. Such systems or devices can implement unique identifier information to selectively enable services to legitimate users. The authentication process involves transmitting unique identifier information over an automotive optical link, or WiFi, or Bluetooth, or a wired connection. For example, car radios can use playback certificates to identify themselves as legitimate devices. Car navigation systems allow access to content information, such as maps. A car key may digitally identify itself as a proper key using a certification. These devices and systems can also be serialized using the built-in security mechanism with an initial set of identifier information.

Figure 1:
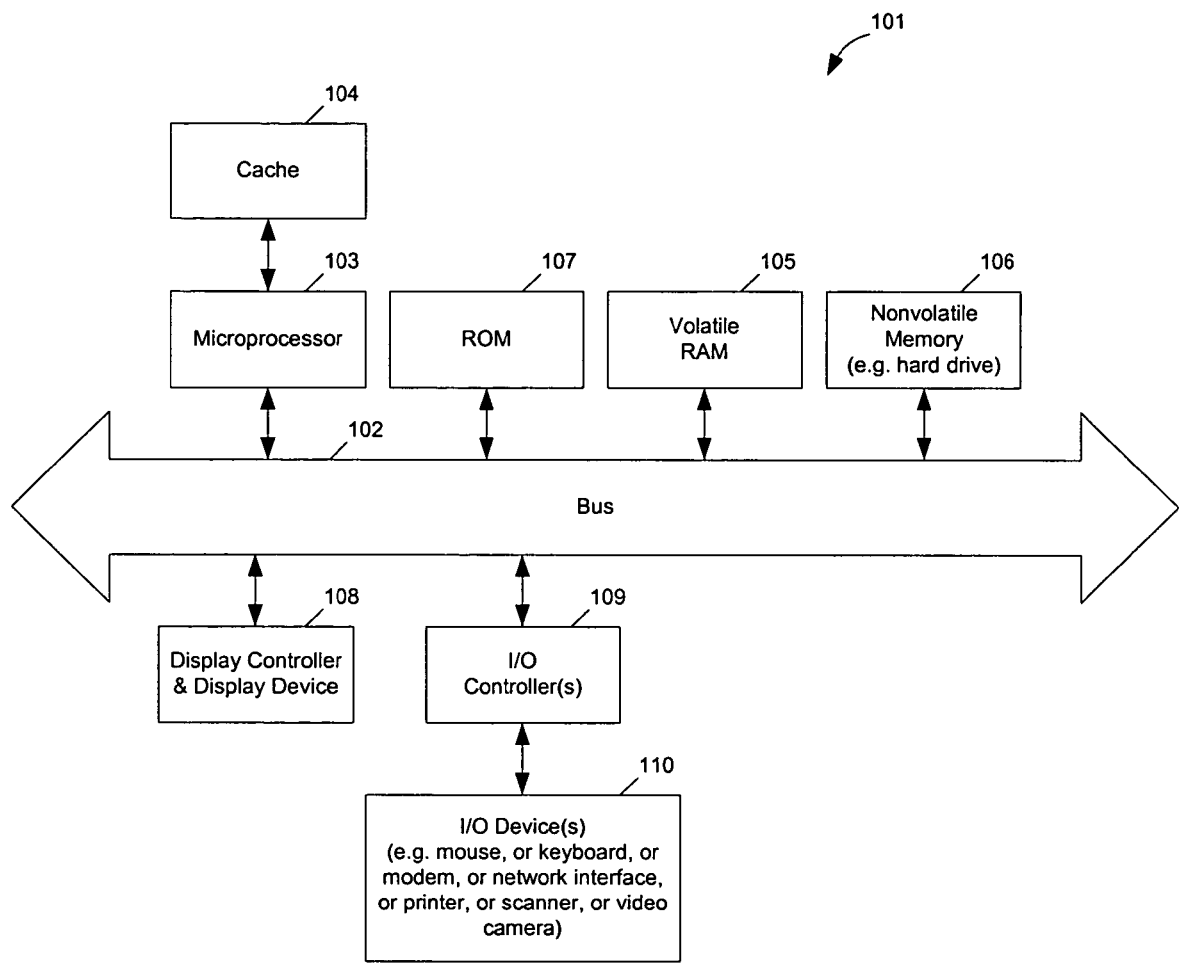
FIG. 1 shows a block diagram example of a data processing system which may be used with the present invention.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems which have fewer or more components may also be used with the present invention. The computer system of FIG. 1 may, for example, be a Sun workstation, or a personal computer (PC) running a Windows operating system, or an Apple Macintosh computer.

As shown in FIG. 1, the computer system 101, which is a form of a data processing system, includes a bus 102 and system core logic 112 which interconnect a microprocessor 103, a ROM 107, and volatile RAM 105 and a non-volatile memory 106. The microprocessor 103, which may be, for example, a G3 or G4 or G5 microprocessor from Motorola, Inc. or IBM is coupled to cache memory 104 as shown in the example of FIG. 1. The bus 102 and system core logic 112 interconnect these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive, a magnetic optical drive, or an optical drive (e.g., a DVD RAM), or other type of memory system which maintains data even after power is removed from the system. Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device that is coupled to the data processing system through a network interface such as a modem or Ethernet interface. The bus 102 may include one or more buses connected to one another through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

A machine readable medium can be used to store software and data which when executed by a data processing system causes the system to perform various methods of the present invention. This executable software and data may be stored in various places including for example ROM 107, volatile RAM 105, non-volatile memory 106 and/or cache 104 as shown in FIG. 1. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM), random access memory (RAM), magnetic disk storage media, optical storage media, flash memory devices, etc.), as well as electrical, optical, acoustical or other forms of propagated signals (e.g., carrier waves, infrared signals, digital signals, etc.), etc.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of manufacturing a product, the method comprising:
    establishing, during a manufacturing, a connection between a data processing system and the product while the product is being manufactured, the product being one of a plurality of products each having an initial set of identifier information and having a digital rights management (DRM) system implemented using the initial set of identifier information, the initial set of identifier information being the same across the plurality of products;
    verifying, during the manufacturing, that the initial set of identifier information stored within the product is valid, wherein a set of identifier information is capable of being used to control distribution of media which is received by the product;
    establishing, during the manufacturing, a secure channel based on the verifying; and
    providing, during the manufacturing, in response to validly verifying the initial set of identifier information, a new set of identifier information for storage in the product, wherein the providing of the new set of identifier information is secured through the secure channel established based on the verifying of the initial set of identifier information that includes securing the new set of identifier information with at least a first portion of the initial set of identifier information and wherein the new set of identifier information is used by the DRM system for further authentications.

2. A method as in claim 1, further comprising:
    verifying the device has the new set of identifier information;
    updating a database to establish that the product has the new set of identifier information;
    wherein the media is at least one of audio media or visual media or audiovisual media;
    wherein the new set of identifier information is unique relative to other products which are otherwise the same as the product; and
    wherein the new set of identifier information is used to decrypt or descramble media received by the product when in use.

3. A method as in claim 2, wherein the connection is secured through the verifying that the initial set of identifier information is valid; and wherein the data processing system establishes the secure channel, which is authenticated, with the product after the verifying.

4. A method as in claim 1, wherein each of the initial and new sets of identifier information comprises a digital certificate; and the verifying comprises using a digital signature verification technique.

5. A method as in claim 1, wherein the product is capable to use the new set of identifier information on a first physical interface to control distribution of media through the first physical interface; and the new set of identifier information is provided to the product through the first physical interface.

6. A method as in claim 5, wherein the product uses a copy protection protocol on the first physical interface to control distribution of media.

7. A method as in claim 1, wherein the product is capable to use the new set of identifier information with a content protection protocol on a first physical interface to protect content distributed through the first physical interface; and the new set of identifier information is provided to the product through a second physical interface secured using the initial set of identifier information and the content protection protocol.

8. A method as in claim 1, further comprising:
    testing the product, wherein the new set of identifier information is not provided to the product if the product fails a test in the testing; and
    storing data indicating that the new set of identifier information is stored in the product.

9. A method to configure a device, the method comprising:
    establishing, during a manufacturing, a connection with the device through successfully verifying an initial set of identifier information stored within the device, the device being one of a plurality of devices each having the initial set of identifier information and having a digital rights management (DRM) system which uses the initial set of identifier information, the initial set of identifier information being the same across the plurality of products and
    through the connection which has been secured through the establishing, communicating, during the manufacturing, the new set of identifier information secured with the at least first portion of the initial set of information to the device as a replacement of the initial set of identifier information in the device and wherein the new set of identifier information is used by the DRM system for further authentications.

10. The method of claim 9, further comprising:
    stamping the new set of identifier information using at least a portion of the initial set of identifier information for authenticity.

11. The method of claim 10, wherein the stamping comprises:
    digitally signing the new set of identifier information according to the initial set of identifier information for communication to the device.

12. The method of claim 11, wherein the new set of identifier information is encrypted using a public key of the initial set of identifier information and digitally signed using a private key of the initial set of identifier information.

13. The method of claim 9, further comprising:
    testing the device for integrity.

14. The method of claim 9, further comprising:
    making a new connection with the device through verifying the new set of identifier information stored within the device to determine whether or not the device successfully assumes the new set of identifier information.

15. The method of claim 14, further comprising:
    storing data indicating that the new set of identifier information is stored in the device.

16. The method of claim 14, further comprising:
    transmitting data through the new connection to test the device.

17. The method of claim 16, further comprising:
    loading the initial set of identifier information into the device before the connection is established with the device;

recording information indicating the device has the new set of identifier information.

18. The method of claim 17, wherein the communication of the new set of identifier information is performed while the device is in a manufacturing process.

19. The method of claim 9, wherein each of the initial and new sets of identifier information comprises a digital certificate which is verifiable using a digital signature verification technique.

20. The method of claim 19, wherein the connection is secured through a key for one of: encryption and scrambling.

21. The method of claim 20, wherein the key is derived using at least a portion of the initial set of identifier information.

22. The method of claim 9, wherein the device is designed to be selectively enabled by a connection made through providing the new set of identifier information for verification.

23. The method of claim 22, wherein the device receives media information through a copy protection system; the new set of identifier information is for operations of the copy protection system.

24. The method of claim 23, wherein the connection is established with the device using a communication protocol of the copy protection system.

25. The method of claim 24, wherein the copy protection system is in accordance with American National Standards Institute/Society of Cable Telecommunications Engineers (ANSI/SCTE) 41.

26. The method of claim 25, wherein the device comprises at least one of:
    a digital television set;
    a set-top box;
    a personal video recorder; or
    a portable media player.

27. The method of claim 22, wherein the new set of identifier information serializes the device to have a unique identity.

28. A method to configure a device, the method comprising:
    establishing, during a manufacturing, a connection with a server through providing an initial set of identifier information stored within the device for a successful verification that includes
    verifying, during the manufacturing, the initial set of identifier information stored within the device, the device being one of a plurality of devices each having the initial set of identifier information and having a digital rights management (DRM) system which uses the initial set of identifier information, wherein the initial set of identifier information is the same across the plurality of products; and
    establishing, during the manufacturing, a secure channel based on the verifying;
    through the secure channel, receiving, during the manufacturing, a new set of identifier information at the device as a replacement of the initial set of identifier information; and
    replacing, during the manufacturing, the initial set of identifier information with the new set of identifier information in the device and wherein the new set of identifier information is used by the DRM system for further authentications.

29. The method of claim 28, further comprising:
    verifying authenticity of the new set of identifier information using the initial set of identifier information.

30. The method of claim 29, wherein the verifying comprises:

verifying that the new set of identifier information received at the device is digitally signed according to the initial set of identifier information.

31. The method of claim 28, wherein the receiving of the new set of identifier information is performed while the device is in a manufacturing process.

32. The method of claim 31, further comprising:
    performing one or more tests on the device;
    wherein the new set of identifier information is received before or after successfully passing the one or more tests.

33. The method of claim 31, wherein each of the initial and new sets of identifier information comprises a digital certificate which is verifiable using a digital signature verification technique.

34. The method of claim 33, wherein the connection is secured through a key for one of: encryption and scrambling; and wherein the key is derived using at least a portion of the initial set of identifier information.

35. The method of claim 28, wherein the device is designed to be selectively enabled by a connection made through providing the new set of identifier information for verification.

36. The method of claim 35, wherein the device receives media information through a copy protection system; the new set of identifier information is for operations of the copy protection system.

37. The method of claim 36, wherein the connection is established with the device using a communication protocol of the copy protection system.

38. The method of claim 37, wherein the connection is secured through a data scrambling scheme of the copy protection system.

39. The method of claim 35, wherein the new set of identifier information serializes the device to have a unique identity.

40. A machine readable medium containing executable computer program instructions which when executed by a data processing system cause said system to perform a method of manufacturing a product, the method comprising:
    establishing, during a manufacturing, a connection between the data processing system and the product while the product is being manufactured, the product being one of a plurality of products each having an initial set of identifier information and having a digital rights management (DRM) system implemented using the initial set of identifier information, the initial set of identifier information being the same across the plurality of products;
    verifying, during the manufacturing, that the initial set of identifier information stored within the product is valid, wherein a set of identifier information is capable of being used to control distribution of media which is received by the product;
    establishing, during the manufacturing, a secure channel based on the verifying; and
    providing, during the manufacturing, in response to validly verifying the initial set of identifier information, a new set of identifier information for storage in the product, wherein the providing of the new set of identifier information is secured through the secure channel established based on the verifying of the initial set of identifier information that includes securing the new set of identifier information with at least a first portion of the initial set of identifier information and wherein the new set of identifier information is used by the DRM system for further authentications.

41. A medium as in claim 40, wherein the method further comprises:
    verifying the device has the new set of identifier information;
    updating a database to establish that the product has the new set of identifier information;
    wherein the media is at least one of audio media or visual media or audiovisual media;
    wherein the new set of identifier information is unique relative to other products which are otherwise the same as the product; and
    wherein the new set of identifier information is used to decrypt or descramble media received by the product when in use.

42. A medium as in claim 41, wherein the connection is secured through the verifying that the initial set of identifier information is valid; and wherein the data processing system provides a session key to the product after the verifying.

43. A medium as in claim 40, wherein each of the initial and new sets of identifier information comprises a digital certificate; and the verifying comprises using a digital signature verification technique.

44. A medium as in claim 40, wherein the product is capable to use the new set of identifier information on a first physical interface to control distribution of media through the first physical interface; and the new set of identifier information is provided to the product through the first physical interface.

45. A medium as in claim 44, wherein the product uses a copy protection protocol on the first physical interface to control distribution of media.

46. A medium as in claim 40, wherein the product is capable to use the new set of identifier information with a content protection protocol on a first physical interface to protect content distributed through the first physical interface; and the new set of identifier information is provided to the product through a second physical interface secured using the initial set of identifier information and the content protection protocol.

47. A machine readable medium containing executable computer program instructions which when executed by a data processing system cause said system to perform a method to configure a device, the method comprising:
    establishing, during a manufacturing, a connection with the device through successfully verifying an initial set of identifier information stored within the device, the device being one of a plurality of devices each having the initial set of identifier information and having a digital rights management (DRM) system which uses the initial set of identifier information, the initial set of identifier information being the same across the plurality of products; and
    through the connection which has been secured through the establishing, communicating, during the manufacturing, the new set of identifier information secured with the at least the first portion of the initial set of identifier information to the device as a replacement of the initial set of identifier information in the device and wherein the new set of identifier information is used by the DRM system for further authentications.

48. The medium of claim 47, wherein the method further comprises:
    making a new connection with the device through verifying the new set of identifier information stored within the device to determine whether or not the device successfully assumes the new set of identifier information.

49. The medium of claim 48, wherein the method further comprises:
    transmitting data through the new connection to test the device.

50. The medium of claim 49, wherein the method further comprises:
    loading the initial set of identifier information into the device before the connection is established with the device;
    recording information indicating the device has the new set of identifier information.

51. The medium of claim 50, wherein the communicating of the new set of identifier information is performed while the device is in a manufacturing process.

52. The medium of claim 47, wherein each of the initial and new sets of identifier information comprises a digital certificate which is verifiable using a digital signature verification technique.

53. The medium of claim 52, wherein the connection is secured through a key for one of: encryption and scrambling.

54. The medium of claim 53, wherein the key is derived using at least a portion of the initial set of identifier information.

55. The medium of claim 47, wherein the device is designed to be selectively enabled by a connection made through providing the new set of identifier information for verification.

56. The medium of claim 55, wherein the device receives media information through a copy protection system; the new set of identifier information is for operations of the copy protection system.

57. The medium of claim 56, wherein the connection is established with the device using a communication protocol of the copy protection system.

58. The medium of claim 57, wherein the copy protection system is in accordance with American National Standards Institute/Society of Cable Telecommunications Engineers (ANSI/SCTE) 41.

59. The medium of claim 58, wherein the device comprises at least one of:
    a digital television set;
    a set-top box;
    a personal video recorder; or
    a portable media player.

60. The medium of claim 55, wherein the new set of identifier information serializes the device to have a unique identity.

61. A machine readable medium containing executable computer program instructions which when executed by a device cause the device to perform a method to configure the device, the method comprising:
    establishing, during a manufacturing, a connection with a server through providing an initial set of identifier information stored within the device for a successful verification that includes
    verifying, during a manufacturing, the initial set of identifier information stored within the device, the device being one of a plurality of devices each having the initial set of identifier information and having a digital rights management (DRM) system which uses the initial set of identifier information, wherein the initial set of identifier information is the same across the plurality of products; and
    establishing, during the manufacturing, a secure channel based on the verifying;

through the secure channel, receiving, during the manufacturing, new set of identifier information at the device as a replacement of the initial set of identifier information; and replacing, during the manufacturing, the initial set of identifier information with the new set of identifier information in the device and wherein the new set of identifier information is used by the DRM system for further authentications.

62. The medium of claim 61, wherein the receiving of the new set of identifier information is performed while the device is in a manufacturing process.

63. The medium of claim 62, wherein each of the initial and new sets of identifier information comprises a digital certificate which is verifiable using a digital signature verification technique.

64. The medium of claim 63, wherein the connection is secured through a key for one of: encryption and scrambling; and wherein the key is derived using at least a portion of the initial set of identifier information.

65. The medium of claim 61, wherein the device is designed to be selectively enabled by a connection made through providing the new set of identifier information for verification.

66. The medium of claim 65, wherein the device receives media information through a copy protection system; the new set of identifier information is for operations of the copy protection system.

67. The medium of claim 66, wherein the connection is established with the device using a communication protocol of the copy protection system.

68. The medium of claim 67, wherein the connection is secured through a data scrambling scheme of the copy protection system.

69. The medium of claim 65, wherein the new set of identifier information serializes the device to have a unique identity.

70. A data processing system for manufacturing a product, the system comprising:

means for establishing, during a manufacturing, a connection between the data processing system and the product while the product is being manufactured, the product being one of a plurality of products each having an initial set of identifier information and having a digital rights management (DRM) system implemented using the initial set of identifier information, the initial set of identifier information being the same across the plurality of products;

means for verifying, during the manufacturing, that the initial set of identifier information stored within the product is valid, wherein a set of identifier information is capable of being used to control distribution of media which is received by the product;

means for establishing, during the manufacturing, a secure channel based on the verifying; and means for providing, during the manufacturing, in response to validly verifying the initial set of identifier information, a new set of identifier information for storage in the product, wherein the means for providing of the new set of identifier information is secured through the secure channel established based on the means for verifying of the initial set of identifier information that includes securing the new set of identifier information with at least a first portion of the initial set of identifier information and wherein the new set of identifier information is used by the DRM system for further authentications.

71. A system as in claim 70, further comprising:

means for verifying the device has the new set of identifier information;

means for updating a database to establish that the product has the new set of identifier information;

wherein the media is at least one of audio media or visual media or audiovisual media;

wherein the new set of identifier information is unique relative to other products which are otherwise the same as the product; and wherein the new set of identifier information is used to decrypt or descramble media received by the product when in use.

72. A system as in claim 71, wherein the connection is secured through the verifying that the initial set of identifier information is valid; and wherein the data processing system provides a session key to the product after the verifying.

73. A system as in claim 70, wherein each of the initial and new sets of identifier information comprises a digital certificate; and the verifying comprises using a digital signature verification technique.

74. A server system to configure a device, the system comprising:

means for establishing, during a manufacturing, a connection with the device through successfully verifying an initial set of identifier information stored within the device, the device being one of a plurality of devices each having the initial set of identifier information and having a digital rights management (DRM) system which uses the initial set of identifier information, the initial set of identifier information being the same across the plurality of products and establishing, during the manufacturing, a secure channel based on the verifying; and through the secure channel, communicating, during the manufacturing, a new set of identifier information secured with the at least a first portion of the initial set of identifier information to the device as a replacement of the initial set of identifier information in the device and wherein the new set of identifier information is used by the DRM system for further authentications.

75. The system of claim 74, further comprising:

means for making a new connection with the device through verifying the new set of identifier information stored within the device to determine whether or not the device successfully assumes the new set of identifier information.

76. The system of claim 75, further comprising:

means for transmitting data through the new connection to test the device.

77. The system of claim 76, further comprising:

means for loading the initial set of identifier information into the device before the connection is established with the device;

means for recording information indicating the device has the new set of identifier information.

78. The system of claim 74, wherein each of the initial and new sets of identifier information comprises a digital certificate which is verifiable using a digital signature verification technique.

79. The system of claim 78, wherein the connection is secured through a key for one of: encryption and scrambling; and the key is derived using at least a portion of the initial set of identifier information.

80. The system of claim 74, wherein the device receives media information through a copy protection system; the new set of identifier information is for operations of the copy protection system.

81. The system of claim 80, wherein the connection is established with the device using a communication protocol of the copy protection system.

82. The system of claim 74, wherein the new set of identifier information serializes the device.

83. A device, comprising:
means for establishing, during a manufacturing, a connection with a server through providing an initial set of identifier information stored within the device for a successful verification that includes
means for verifying, during the manufacturing, the initial set of identifier information stored within the device, the device being one of a plurality of devices each having the initial set of identifier information and having a digital rights management (DRM) system which uses the initial set of identifier information, wherein the initial set of identifier information is the same across the plurality of products; and
means for establishing, during the manufacturing, a secure channel based on the verifying;
means for, through the secure channel, receiving, during the manufacturing, a new set of identifier information at the device as a replacement of the initial set of identifier information; and
means for replacing, during the manufacturing, the initial set of identifier information with the new set of identifier information in the device and wherein the new set of identifier information is used by the DRM system for further authentications.

84. The device of claim 83, wherein each of the initial and new sets of identifier information comprises a digital certificate which is verifiable using a digital signature verification technique.

85. The device of claim 84, wherein the connection is secured through a key for one of: encryption and scrambling; and wherein the key is derived using at least a portion of the initial set of identifier information.

86. The device of claim 83, wherein the device receives media information through a copy protection system; the new set of identifier information is for operations of the copy protection system.

87. The device of claim 86, wherein the connection is established with the device using a communication protocol of the copy protection system; and the connection is secured at least through a data scrambling scheme of the copy protection system.

88. A device, comprising:
a memory to store an initial set of identifier information, the device being one of a plurality of devices each having the initial set of identifier information and having a digital rights management (DRM) system which uses the initial set of identifier information, the initial set of identifier information being the same across the plurality of products;
a first communication port; and
a logic circuit coupled with the first communication port and the memory, the logic circuit configured to use the first communication port to establish, during a manufacturing, a secure connection with a server through a successful verification that includes verifying, during the manufacturing, the initial set of identifier information stored within the device; and
the logic circuit configured to receive, during the manufacturing, a new set of identifier information as a replacement of the initial set of identifier information, the logic circuit to replace, during the manufacturing, the initial set of identifier information with the new set of identifier information in the memory and wherein the new set of identifier information is used by the DRM system for further authentications.

89. The device of claim 88, wherein the logic circuit is capable to use the new set of identifier information on a first communication port to control media distribution over the first communication port; and wherein the initial set of identifier information is not erased after it is replaced.

90. The device of claim 89, wherein the logic circuit is capable to use a copy protection protocol on the first communication port to control media distribution; and the new set of identifier information is to be secured in communication from the server to the device using the initial set of identifier information and the copy protection protocol.

91. The device of claim 88, further comprising:
a second communication port coupled with the logic circuit;
wherein the product is capable to use the new set of identifier information with a content protection protocol on the second communication port to protect content distributed through the second communication; and
wherein the new set of identifier information is to be secured in communication from the server to the device using the initial set of identifier information and the copy protection protocol.

92. The device of claim 88, wherein the logic circuit is to verify authenticity of the new set of identifier information using the initial set of identifier information.

93. The device of claim 92, wherein the logic circuit is to verify authenticity of the new set of identifier information through verifying that the new set of identifier information received at the device is digitally signed according to the initial set of identifier information.

94. The device of claim 92, wherein the logic circuit is to decrypt the new set of identifier information using a public key of the initial set of identifier information and to verify a digital signature signed using a private key of the initial set of identifier information.

95. The device of claim 88, wherein each of the initial and new sets of identifier information comprises a digital certificate which is verifiable using a digital signature verification technique.

96. The device of claim 95, wherein the connection with the server is secured using a dynamically generated session key and authenticated using at least a portion of the initial set of identifier information.

97. The device of claim 88, wherein the device is to receive media information over the first communication port through a copy protection system which uses the new set of identifier information to control access to media information.

98. The device of claim 97, wherein the connection with the server is established with the device using a communication protocol of the copy protection system; and the connection is secured at least through the communication protocol of the copy protection system.

* * * * *